US012571368B2

(12) United States Patent
Miller

(10) Patent No.: US 12,571,368 B2
(45) Date of Patent: Mar. 10, 2026

(54) VERTICAL-AXIS WIND TURBINE SYSTEMS AND DEVICES

(71) Applicant: David Barr Miller, Goshen, IN (US)

(72) Inventor: David Barr Miller, Goshen, IN (US)

( * ) Notice: Subject to any disclaimer, the term of this patent is extended or adjusted under 35 U.S.C. 154(b) by 0 days.

(21) Appl. No.: 18/631,023

(22) Filed: Apr. 9, 2024

(65) Prior Publication Data

US 2025/0012250 A1 Jan. 9, 2025

Related U.S. Application Data

(60) Provisional application No. 63/495,200, filed on Apr. 10, 2023.

(51) Int. Cl.
| *F03D 3/04* | (2006.01) |
| *F03D 3/00* | (2006.01) |
| *F03D 9/25* | (2016.01) |

(52) U.S. Cl.
CPC ........... *F03D 3/0409* (2013.01); *F03D 3/005* (2013.01); *F03D 9/25* (2016.05)

(58) Field of Classification Search
CPC .......... F03D 3/0409; F03D 3/005; F03D 9/25; F03D 1/04; F03D 13/20; Y02E 10/74
See application file for complete search history.

(56) References Cited

U.S. PATENT DOCUMENTS

| 163,383 A | 5/1875 | Kimball |
| 264,164 A | 9/1882 | Jackson |

| 387,102 A | 7/1888 | Nagel |
| 411,550 A | 9/1889 | Haberlein |
| 624,816 A | 5/1899 | Jarvis |
| 648,442 A | 5/1900 | Scott |
| 752,764 A | 2/1904 | Dunne |
| 757,800 A | 4/1904 | Williams |
| 863,715 A | 8/1907 | Higby et al. |
| 1,439,316 A | 12/1922 | McArdle |
| 1,697,574 A | 1/1929 | Savonius |
| 1,787,072 A | 12/1930 | Henderson |
| 1,909,216 A | 5/1933 | Newman |
| 1,935,097 A | 11/1933 | Nelson |
| 2,348,671 A | 5/1944 | Zgliczynski |

(Continued)

FOREIGN PATENT DOCUMENTS

| CN | 101509463 A | 8/2009 | |
| CN | 109139382 A * | 1/2019 | ............... F03D 9/25 |

(Continued)

OTHER PUBLICATIONS

CZ-422497-A3, English language machine translation (Year: 1999).*
JP-2011064084-A, English language machine translation (Year: 2011).*

*Primary Examiner* — Wesley G Harris

(74) *Attorney, Agent, or Firm* — Buss & Benefield, PLLC; Michael A. Benefield; Brian Buss

(57) ABSTRACT

The invention generally includes vertical-axis wind turbine systems and devices that concentrate wind forces by receiving wind in through a funnel-shaped scoop and then imparting the received wind onto blades rotating between two coaxial drums. The wind concentrated between the blades then exits through an exhaust cone. The invention can also include electrical power generators that can start with minimal cogging and produce power in proportioned to the wind speed.

10 Claims, 13 Drawing Sheets

(56) References Cited

U.S. PATENT DOCUMENTS

| | | | |
|---|---|---|---|
| 2,869,934 | A | 1/1959 | Milligan et al. |
| 3,970,409 | A | 7/1976 | Luchuk |
| 4,017,204 | A | 4/1977 | Sellman |
| 4,162,410 | A | 7/1979 | Amick |
| 4,197,055 | A | 4/1980 | Campbell |
| 4,204,805 | A | 5/1980 | Bolie |
| 4,255,085 | A | 3/1981 | Evans |
| 4,364,710 | A | 12/1982 | Campbell |
| 4,566,853 | A | 1/1986 | Likitanupak |
| 4,609,827 | A | 9/1986 | Nepple |
| 5,009,569 | A | 4/1991 | Hector, Sr. et al. |
| 5,137,416 | A * | 8/1992 | Mohrman ................. F03D 5/04 |
| | | | 415/121.2 |
| 5,732,642 | A | 3/1998 | DeSilva |
| 5,744,896 | A | 4/1998 | Kessinger, Jr. et al. |
| 5,841,212 | A | 11/1998 | Mita et al. |
| 5,952,755 | A | 9/1999 | Lubas |
| 5,982,069 | A | 11/1999 | Rao |
| 5,982,074 | A | 11/1999 | Smith et al. |
| 5,995,809 | A | 11/1999 | Kobayashi |
| 6,002,193 | A | 12/1999 | Canini et al. |
| 6,006,418 | A | 12/1999 | Takeda et al. |
| 6,051,905 | A | 4/2000 | Clark |
| 6,087,753 | A | 7/2000 | Pinkerton |
| 6,153,959 | A | 11/2000 | Lorenzo |
| 6,255,753 | B1 | 7/2001 | MacDonald |
| 6,278,212 | B1 | 8/2001 | Kalsi |
| 6,411,002 | B1 | 6/2002 | Smith et al. |
| 6,655,916 | B2 | 12/2003 | Ramisa Navarro |
| 6,910,873 | B2 | 6/2005 | Kaliski |
| 7,215,037 | B2 | 5/2007 | Scalzi |
| 7,329,099 | B2 | 2/2008 | Hartman |
| 7,501,922 | B2 | 3/2009 | Kazadi |
| 7,834,502 | B2 | 11/2010 | Kinoshita et al. |
| 7,863,765 | B2 | 1/2011 | Yang |
| 7,956,484 | B2 | 6/2011 | Stiesdal |
| 8,030,817 | B2 | 10/2011 | Sakai et al. |
| 8,063,502 | B1 | 11/2011 | Boyles |
| 8,177,482 | B2 | 5/2012 | Chio |
| 8,197,178 | B1 | 6/2012 | Chen |
| 8,591,170 | B1 | 11/2013 | Rawls |
| 8,613,587 | B2 | 12/2013 | Reilly |
| 8,912,704 | B2 | 12/2014 | Petter et al. |
| 9,068,557 | B1 | 6/2015 | Garrett |
| 9,371,818 | B1 | 6/2016 | Monto |
| 9,644,603 | B1 | 5/2017 | Thiele et al. |
| 9,856,853 | B2 | 1/2018 | French |
| 10,634,116 | B1 | 4/2020 | Shoffler |
| 10,648,452 | B1 | 5/2020 | Galstyan et al. |
| 10,738,760 | B2 | 8/2020 | Tutunaru |
| 11,118,557 | B2 | 9/2021 | Pierantozzi |
| 11,149,715 | B2 | 10/2021 | Moore |
| 11,290,995 | B2 | 3/2022 | Hwang et al. |
| 11,509,202 | B2 | 11/2022 | Lin et al. |
| 11,588,359 | B2 | 2/2023 | Kinouchi et al. |
| 2002/0149278 | A1 | 10/2002 | Eydelie et al. |
| 2003/0030339 | A1 | 2/2003 | Dombrovski |
| 2003/0049128 | A1 | 3/2003 | Rogan |
| 2004/0036297 | A1 | 2/2004 | John |
| 2004/0105754 | A1 | 6/2004 | Takahashi |
| 2004/0120820 | A1 | 6/2004 | Dery et al. |
| 2004/0265116 | A1 | 12/2004 | Kaneda |
| 2005/0084373 | A1 | 4/2005 | Suzuki |
| 2005/0212300 | A1 | 9/2005 | Kimura et al. |
| 2006/0138890 | A1 | 6/2006 | Kato |
| 2006/0158055 | A1 | 7/2006 | Ivtsenkov |
| 2006/0171811 | A1 | 8/2006 | Hallac |
| 2006/0226726 | A1 | 10/2006 | Shim |
| 2007/0036650 | A1 | 2/2007 | Lau |
| 2008/0131281 | A1 | 6/2008 | Kariya |
| 2009/0160196 | A1 | 6/2009 | Metzloff |
| 2009/0257874 | A1 | 10/2009 | Rice |
| 2009/0274561 | A1 | 11/2009 | Gornatti |
| 2009/0289459 | A1 | 11/2009 | Chung |
| 2010/0003130 | A1 | 1/2010 | Gual |

| | | | |
|---|---|---|---|
| 2010/0074743 | A1 | 3/2010 | Jairazbhoy et al. |
| 2010/0143096 | A1 | 6/2010 | Carosi et al. |
| 2010/0213722 | A1 | 8/2010 | Scott |
| 2010/0213723 | A1 | 8/2010 | Kazadi |
| 2010/0254798 | A1 | 10/2010 | Tutt |
| 2010/0254808 | A1 | 10/2010 | Kim et al. |
| 2010/0308597 | A1 | 12/2010 | Gyorgyi |
| 2011/0076154 | A1 | 3/2011 | Yan |
| 2011/0133471 | A1 | 6/2011 | Chung |
| 2011/0133474 | A1 | 6/2011 | Haar |
| 2011/0135459 | A1 | 6/2011 | Krauss |
| 2011/0305563 | A1 | 12/2011 | Saunders, III |
| 2011/0318167 | A1* | 12/2011 | Miller ................... F03D 3/0427 |
| | | | 415/203 |
| 2012/0032447 | A1 | 2/2012 | Bang-Moeller |
| 2012/0038161 | A1 | 2/2012 | Outhred et al. |
| 2012/0039714 | A1 | 2/2012 | Lee |
| 2012/0153632 | A1 | 6/2012 | Suttisiltum |
| 2012/0171011 | A1 | 7/2012 | Iwanow |
| 2012/0187698 | A1 | 7/2012 | Bassett |
| 2012/0200177 | A1 | 8/2012 | Atkinson et al. |
| 2012/0213630 | A1 | 8/2012 | Alfonsi |
| 2013/0017083 | A1 | 1/2013 | Graham et al. |
| 2013/0023500 | A1 | 1/2013 | Boyd et al. |
| 2013/0028745 | A1 | 1/2013 | Blackburn et al. |
| 2013/0033043 | A1 | 2/2013 | Huang |
| 2013/0101398 | A1 | 4/2013 | Perry |
| 2013/0115069 | A1 | 5/2013 | Zha et al. |
| 2013/0149144 | A1 | 6/2013 | Lau |
| 2013/0216358 | A1* | 8/2013 | Reilly ................... F03D 3/0409 |
| | | | 415/125 |
| 2013/0251506 | A1 | 9/2013 | Chu |
| 2013/0277982 | A1 | 10/2013 | Choi et al. |
| 2013/0307276 | A1 | 11/2013 | Ko |
| 2014/0008916 | A1 | 1/2014 | Shimizu |
| 2014/0050586 | A1 | 2/2014 | Chio |
| 2014/0091673 | A1 | 4/2014 | Anbarasu |
| 2014/0105743 | A1 | 4/2014 | Bassett |
| 2014/0178189 | A1 | 6/2014 | Cassidy |
| 2014/0314555 | A1 | 10/2014 | Welch |
| 2014/0356157 | A1 | 12/2014 | Mayor et al. |
| 2014/0375060 | A1 | 12/2014 | Lin et al. |
| 2015/0108758 | A1 | 4/2015 | Oakes et al. |
| 2015/0184630 | A1 | 7/2015 | Tatikyan et al. |
| 2015/0211475 | A1 | 7/2015 | Vorias |
| 2016/0298598 | A1 | 10/2016 | Taniguchi |
| 2017/0107972 | A1 | 4/2017 | Tubaileh et al. |
| 2017/0130697 | A1* | 5/2017 | Huang ................... F03D 3/005 |
| 2017/0187252 | A1 | 6/2017 | Takahashi et al. |
| 2017/0241403 | A1 | 8/2017 | Spencer |
| 2017/0248122 | A1 | 8/2017 | Williams |
| 2018/0017036 | A1 | 1/2018 | Steiner et al. |
| 2018/0100483 | A1 | 4/2018 | Tutunaru |
| 2018/0142672 | A1 | 5/2018 | Azmudeh |
| 2018/0180018 | A1 | 6/2018 | Kurita |
| 2018/0347546 | A1 | 12/2018 | Piskorz et al. |
| 2019/0003452 | A1 | 1/2019 | Barcia, Jr. |
| 2019/0055927 | A1 | 2/2019 | Suzuki |
| 2019/0093627 | A1 | 3/2019 | Wang |
| 2019/0277250 | A1 | 9/2019 | Popek |
| 2020/0235635 | A1 | 7/2020 | Zhang et al. |
| 2021/0246870 | A1 | 8/2021 | Sen |
| 2021/0355909 | A1 | 11/2021 | Pienczykowski |
| 2022/0298931 | A1 | 9/2022 | Cheon |
| 2022/0399768 | A1 | 12/2022 | Aso et al. |
| 2023/0006505 | A1 | 1/2023 | Prucher |
| 2023/0018438 | A1 | 1/2023 | Yao et al. |
| 2023/0032576 | A1 | 2/2023 | Lemperth |
| 2023/0051582 | A1 | 2/2023 | Witt et al. |

FOREIGN PATENT DOCUMENTS

| | | | | | |
|---|---|---|---|---|---|
| CN | 213540613-U | 062021 | * | 6/2021 | ............ Y02E 10/74 |
| CZ | 422497 | A3 | * | 7/1999 | .............. F03D 3/00 |
| DE | 19741495 | | | 3/1999 | |
| DE | 102004031655 | | | 2/2006 | |
| EP | 2469078 | A2 | * | 6/2012 | ............ F03D 15/10 |
| EP | 2267299 | | | 7/2016 | |
| FR | 2483533 | A1 | * | 12/1981 | ............ F03D 3/067 |

(56) References Cited

FOREIGN PATENT DOCUMENTS

| | | | | | |
|---|---|---|---|---|---|
| FR | 2556784 | A1 * | 6/1985 | ............. | F03D 15/10 |
| JP | S62282174 | | 9/1987 | | |
| JP | 2011064084 | A * | 3/2011 | ............. | F03D 13/20 |
| JP | 2012251534 | | 12/2012 | | |
| JP | 2013-044323 | A | 3/2013 | | |
| JP | 2022-105966 | | 7/2022 | | |
| WO | 1996/30647 | | 10/1996 | | |
| WO | WO-2005086959 | A2 * | 9/2005 | ............. | F03D 11/04 |
| WO | 2008/002149 | | 1/2008 | | |
| WO | WO-2009092144 | A1 * | 7/2009 | .............. | F03D 3/04 |
| WO | 2011/044130 | | 4/2011 | | |
| WO | 2012/017303 | | 2/2012 | | |

* cited by examiner

VERTICAL-AXIS WIND TURBINE SYSTEMS AND DEVICES

CROSS-REFERENCE TO RELATED APPLICATIONS

This application claims the benefit of U.S. Provisional Patent Application Ser. No. 63/495,200, filed Apr. 10, 2023, which is hereby incorporated by reference in its entirety.

BACKGROUND OF THE INVENTION

1. Field of the Invention

The inventions described herein generally relate to systems and devices for providing vertical-axis wind turbine systems and devices.

2. Description of Related Art

Modern day wind turbines generally fit into either of two categories: horizontal-axis wind turbines and vertical-axis wind turbines. Horizontal-axis wind turbines includes blades that rotate in a plane at right angles to their axis and the wind. Vertical-axis wind turbines include blades that rotate with, then return against, the wind. Both horizontal-axis wind turbines and vertical-axis wind turbines currently require sophisticated geometric design and construction of the blades and other components. This is, in part, because the blades interact with only a small portion of the wind blowing past the device at any instant, thereby permitting the device to make use of only a fraction of wind energy that is available.

Both horizontal-axis wind turbines and vertical-axis wind turbines achieve much of their efficiency by using geometrically complex parts whose operation requires precise tolerances. Both horizontal-axis wind turbines and vertical-axis wind turbines have exposed blades that are vulnerable to damage from weather like hail or icing, as well as from high winds and sudden changes in wind velocity, or gusting. Horizontal-axis wind turbines are famous for indiscriminate lethality to birds, and excess noise characterizes many designs.

Horizontal-axis wind turbines need to turn to catch the wind, which often require sophisticated and expensive turning systems. As such, horizontal-axis wind turbines designs have become very sophisticated and integrate huge blades with complex gearing, turning, and power generating units on a costly tower far above the ground. The height of the components makes access for construction, maintenance, and repair hazardous and costly.

Vertical-axis wind generally turbines resolve the directional shortcomings of horizontal-axis wind turbines by using designs that turn due to wind from any direction. Designs implemented over the years often use complex mechanical systems, such as blades with complex curves and shapes and electronic controls, to minimize risks from excessive wind and to extract energy from suitable winds.

Wind turbines can incorporate conventional electric generators that use permanent magnets, either axial- or radial flux, that have problems starting from a stop (zero wind velocity) due to cogging, which is where the permanent magnets lock onto proximal solid core windings. Some permanent-magnet designs try to minimize cogging by using hollow-core stator coils, but doing so detracts from their efficiency during operation. In addition, wind-driven electrical generating systems are limited by the capacity of the generator, which are typically designed to produce optimal power at a particular rotational speed, which in turn is tied to a particular, narrow range of wind speeds.

Several of the systems and devices described above are discussed in U.S. Pat. No. 7,863,765 (to Yang) and U.S. Pat. No. 11,149,715 (to Moore), as well as in U.S. Patent Pub. No. 2021/0355909 (to Pienczykowski), each of which is hereby incorporated herein by reference in its entirety.

In view of the background in this area, there remain needs for improved and/or alternative systems and devices for generating power from wind turbines, such as vertical-axis wind turbines. The present inventions are addressed to those needs.

BRIEF SUMMARY OF THE INVENTION

In certain aspects, the inventions disclosed herein can generally be directed to vertical-axis wind turbines that have a scoop that acts in the manner of a funnel to receive, accelerate, and compress air from wind, and that directs the air through an opening in an outer drum onto turbine blades. Illustratively, the blades can be attached at intervals on the outer surface of a rotating inner drum, and/or to toroidal top and bottom enclosures which can be attached to the inner drum. The inner drum surface, turbine blades, and the inner surface of the outer drum, with closures at top and bottom, can form a succession of dynamic cells which together form an annulus, termed the power annulus. Each of these cells, in succession, can restrict the air such that much of its kinetic energy is transferred to its blade before it rotates and the air exits the outer drum. The inner drum can be fixedly attached to a coaxial shaft that can transfer rotational energy to one or more devices directly or through transfer means which may include one or more pulleys, gears, chains, and/or belts. The outer drum, with its inner workings described above, and the attached scoop can be rotated by a directional vane which is fixedly attached to the outer drum, to optimize airflow into the air scoop. The outer drum can be supported vertically and laterally by a support structure, such as a silo, inside of which other components of the mechanical or electrical energy production system may be housed. Embodiments that include weather and EMP protection, an inlet safety screen, overspeed flaps, and dividers to enhance the airflow through each cell, are described below. Other safety equipment which does not directly impact normal function, such as standard protective padding on exposed moving edges, can be considered as intrinsic to any device.

In one aspect, the invention provides a vertical-axis wind turbine that includes an outer drum that has a top end, a bottom end, an outer surface, and an inner surface, where the outer drum has a vertical centerline that extends from the top end of the outer drum to the bottom end of the outer drum along the cross-sectional center of the outer drum. The outer drum also includes an air inlet opening that permits air to flow from the outer surface of the outer drum to the inner surface of the outer drum and an air outlet opening that permits air to flow from inner surface of the outer drum to the outer surface of said outer drum. The vertical-axis wind turbine also includes an inner drum that has a top end, a bottom end, an outer surface, and an inner surface, where the inner drum has a vertical centerline that extends from the top end of the inner drum to the bottom end of the inner drum along the cross-sectional center of the inner drum. A plurality of elongate blades, each having a bottom end, a top end, an outer edge, and an inner edge, are included, with each inner edge of each elongate blade being affixed to the outer surface of the inner drum. The bottom end of each elongated blade is located at the bottom end of the inner drum and the top end of each elongated blade is located at the top end of the inner drum. The inner drum and the plurality of affixed elongate blades are disposed within the outer drum. A shaft extends from the top end of the inner drum to a location beneath the bottom end of the inner drum, and the shaft is configured to rotate the inner drum within the outer drum. The inner drum and the outer drum are arranged in a manner such that the shaft occupies the vertical centerline of the outer drum and the shaft extends vertically through the inner drum offset from the vertical centerline of the inner drum such that the outer edge of each elongated blade touches only a segment of the inner wall of the outer drum during the rotation of the inner drum with the shaft.

In another aspect, the invention provides a vertical-axis wind turbine that includes an outer drum that has an outer surface, an inner surface, and a top end, where the outer drum further includes an air inlet opening and an air outlet opening. The vertical-axis wind turbine also includes a scoop that is configured to direct air into the air inlet opening of the outer drum and an exhaust funnel that is configured to direct air from the outer drum. A directional vane is attached to the top end of the outer drum, and the directional vane is configured to rotate said outer drum, such as in conjunction with forces received by the scoop from wind flowing into the air inlet opening and forces received by the exhaust funnel from wind flowing out of the air outlet opening, in a manner that directs air from prevailing wind currents into said scoop.

DETAILED DESCRIPTION OF THE INVENTION

For the purposes of promoting an understanding of the principles of the invention, reference will now be made to certain embodiments thereof and specific language will be used to describe the same. It will nevertheless be understood that no limitation of the scope of the invention is thereby intended, such alterations, further modifications and further applications of the principles of the invention as described herein being contemplated as would normally occur to one skilled in the art to which the invention relates.

Figure 1:
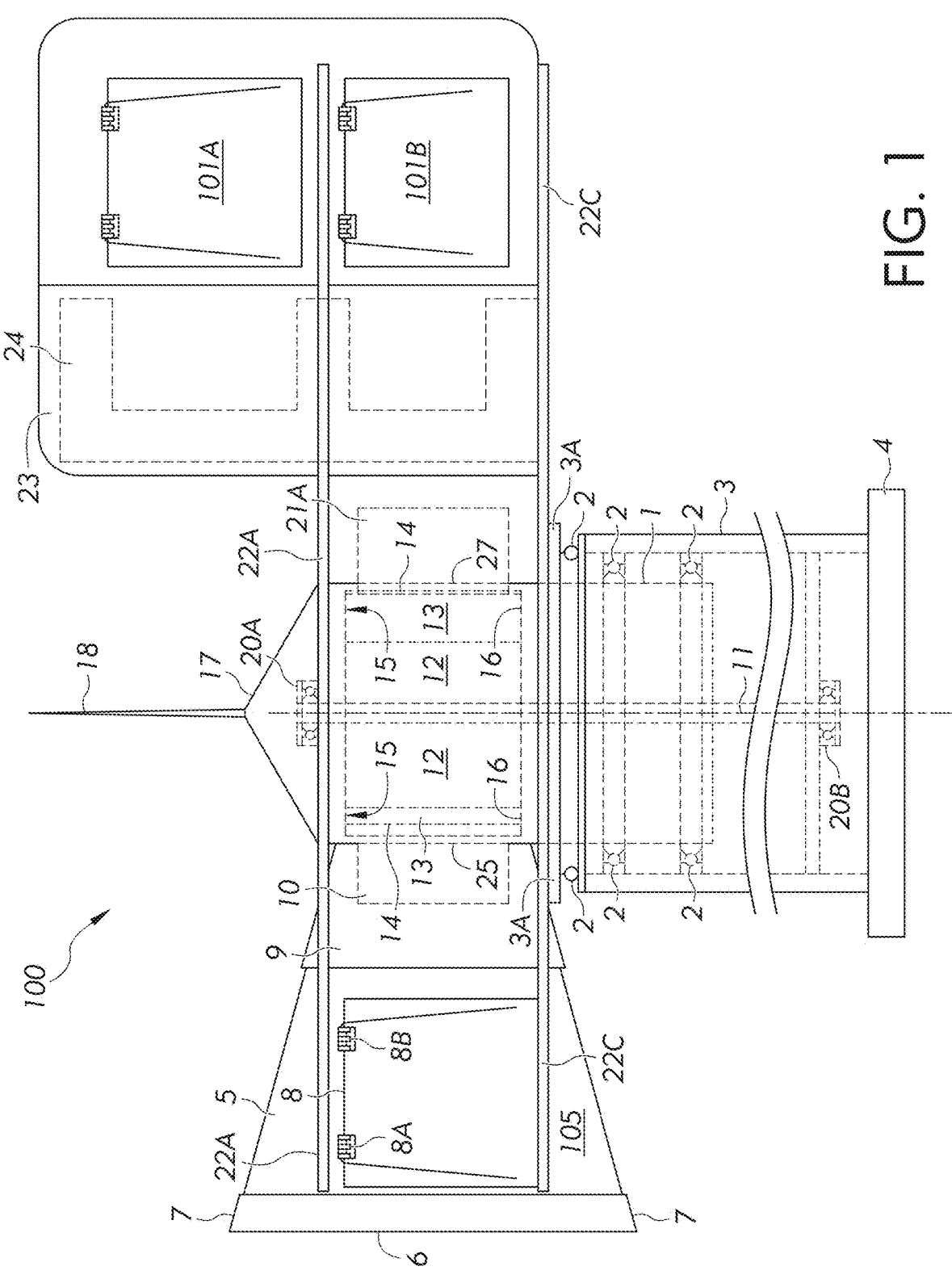
FIG. 1 depicts a side elevation view of an illustrative embodiment of the invention.

Referring to FIG. 1, disclosed is a generally cylindrical outer drum 1 of an illustrative vertical-axis turbine 100 that can be supported by wheels, bearings, or some combination or adaptation of these 2. A support ring 3A can be fixedly attached on the outside circumference of the outer drum 1, and can hold vertically supporting wheels or bearings 2 that can roll on one or more horizontal surfaces fixedly attached at some predetermined vertical location to a support structure 3 of predetermined height and anchored securely on a suitable, stable foundation 4. This foundation 4 can be a concrete pad or similar, the upper structure of a building, whether constructed for this purpose or another, or a moving platform such as a boat, ship, or motor vehicle. The support structure 3 can be constructed or modified so as to support the entire vertical-axis wind turbine 100 vertically, as well as withstand lateral forces from any direction due to wind. In certain embodiments, the support structure 3 consists of preformed sections of concrete culvert pipe, mounted vertically end to end, at least one of which includes an opening through which components and personnel can access the interior. The support structure 3 may, in other embodiments, be constructed of other suitable substance or substances, such as corrugated steel drainage pipe; or in yet further embodiments, such as for a larger vertical-axis wind turbine 100, may consist of a suitably modified silo 300, as commonly appears on traditional farms in North America.

The vertical-axis wind turbine 100 can also include a scoop 5, that can be made of sheet metal or any other suitable material that is capable of maintaining its shape and form. Illustratively, the scoop 5 can include an inlet 6 that can be covered by an inlet screen 7 that can be made, illustratively, of chicken-wire fencing or some similar material scanty enough to let air pass freely, and with a grid small enough to exclude small objects, including debris and birds, for example. The inlet screen 7 can extend over the inlet 6, with its edges wrapped around the edges of the scoop 5. The lower surface of the scoop 5 can slope upward toward the outer drum 1, so precipitation or debris that might enter the scoop will be gravitationally pulled back toward and out the inlet 6, away from the outer drum 1.

The scoop 5 can also include a front side wall 105 that can have a first overwind flap 8 fitted within an opening in the front side wall 105. The first overwind flap 8 can include springs 8A, 8B along its top edge, that can attach the first overwind flap 8 to the front side wall 105 of the scoop 5. In other embodiments, however, the springs 8A, 8B can attach the first overwind flap 8 to the front side wall 105 of the scoop 5 along the leading or windward edge of the overwind flap 8. When excessive wind enters the scoop 5, the first overwind flap 8 can open so as to permit an exit flow for the excessive wind. When the wind forces die down within the scoop 5, the springs 8A, 8B can close the first overwind flap 8 so as to funnel the wind into the outer drum 1. In certain embodiments, a second overwind flap (not depicted) on the back side wall (not depicted) of the scoop 5 can be included so as to add further overflow/over pressure protection to the scoop 5. In yet alternative embodiments, the first overwind flap 8 and the second overwind flap (not depicted) can swing to locations both within the scoop 5 and outside of the scoop 5 so as to permit the passage from wind from within the scoop 5 to outside the scoop 5 and to permit wind to pass from outside the scoop 5 to within the scoop so as to prevent damage to the scoop 5 in windy conditions such as storms where the wind may blow against the front side wall 105 and back side wall (not depicted). Additionally, high-velocity winds entering the scoop 5, even in non-destructive weather, may pull one or both of the first overwind flap 8 and second overwind flap (not depicted) into the scoop 5 by the Bernoulli effect, disrupting airflow and lessening the Bernoulli effect, whereby one or both of the first overwind flap 8 and the second overwind flap (not depicted) will at least partially shut, and airflow will settle toward an equilibrium velocity. In certain embodiments, these overwind actions can all occur mechanically, and nearly instantaneously, without reliance on any outside electrical or mechanical control. This technologically simple solution to this overwind situation does not exclude an embodiment wherein a different mechanical, electronic, or radio-controlled control system might perform the same functions.

As also shown in FIG. 1, in certain embodiments, the outer drum 1 can include an air inlet opening 25 that can be formed from a cutout from the outer drum 1 that is bent outwardly from in the inlet drum 1 and that can occupy a rectangular section 10. An air inlet collar 9 can be provided in certain embodiments. Illustratively, the air inlet collar 9 can be made of material similar to that of the scoop 5, or can alternatively be made of any other suitable material. The air inlet collar 9 can nest the scoop 5 into the larger end of the air inlet collar 9, while the smaller end of the air inlet collar 9 can reside around the rectangular section 10 cut from the outer drum 1. In certain embodiments, padding can be inserted around the periphery or each end of the inlet collar 9 such that airflow will not be impeded nor allowed to escape through the edges where the inlet collar joins with the scoop 5 and the rectangular section 10.

A generally cylindrical inner drum 12 can reside within the outer drum 1 and can be disposed coaxially within the outer drum 1, toward the upper portion of the outer drum 1. Illustratively, the inner drum 12 can rotate, such as when wind hits blades 13 that are disposed vertically on the outer surface of the inner drum. In certain embodiments, a plurality of blades 13 can occupy a flat, rectangular shape, and each blade 13 can be radially attached to the outer surface of the inner drum 12 along their long edge. As these blades 13 rotate with the inner drum 12, they move air through the annular region created by the inner surface of the outer drum 1 and the outer surface of the inner drum 12. This annular region, which is where energy is transferred from the moving air to the rotating blades, can be called the power annulus 31, and is generally coextensive with the blades 13 while being bounded by the outer surface of the inner drum 12 and the inner surface of the outer drum 1.

Illustratively, the outer edge of each blade 13 (which is the long edge of each blade 13 closest to the inner diameter of the outer drum 1) can include a blade extension 14, which can sweep along the inner surface of the outer drum 1. In certain embodiments, the blade extension 14 can comprise a flexible material, such as a polymer, but in other embodiments, any suitable material can be used.

Although the blades 13 can occupy a flat, rectangular shape that are rigidly mounted to the outer surface of the inner drum 12, in other embodiments, the blades 13 (and the blade extensions 14) can occupy any suitable shape and can be mounted in any suitable configuration. In certain embodiments, for example, each blade 13 can be mounted to the outer surface of the inner drum 12 using a plurality of springs, which permit each blade 13 to swivel such that when the wind velocities (and corresponding rotational velocity of the inner drum 12 are low, each blade 13 resides close to the outer surface of the inner drum 12, so as to permit air to move through the power annulus 31. As wind speed increases, each blade 13 can lift so as to better engage the flowing air, and at peak wind velocity, to occupy essentially right angles to the outer surface of the inner drum 12. In order to help stop the blades 13 at the appropriate position, stoppers (not depicted) can be located at appropriate positions on the bottom surface of a top toroid 15 enclosure and the top surface of a bottom toroid enclosure 16, optionally attaching each stopper to the outer surface of the inner drum 12, as well. In yet another embodiment, the stoppers can comprise a second set of springs which are configured to allow the blades to swivel, but to also provide stiff resistance to further swiveling. The use of a second set of springs can lessen the impact effects from blades 13 hitting static stoppers, can mitigate stress from sudden gusts of high-velocity air, and can permit greater continuity of air flow through the power annulus 31.

In certain embodiments, the power annulus 31 section of the vertical-axis wind turbine 100 can be enclosed at its top by a top toroid enclosure 15 that can reside across the top of the power annulus 31. Similarly, a bottom toroid enclosure 16 can reside across the bottom of the power annulus 31 section. Illustratively, both the top toroid enclosure 15 and the bottom toroid enclosure 15 can occupy a substantially flat shape, but in other embodiments, each can occupy any suitable shape. Either or both of the top toroid enclosure 15 and the bottom toroid enclosure 16 may be integrated with or serve as mounts for components of electrical generators or other devices, although these are not illustrated in FIG. 1.

Illustratively, a cover 17 can be secured to the top of the outer drum 1 so as to shield and seal against the entry of precipitation or other elements. Along with a lightning rod 18 and electrical grounding, the cover 17, can incorporate a metallic content and design, so as to mitigate or protect against electrical dangers which also include EMPs.

As depicted in FIG. 1, a flap 21 comprising a portion of the outer drum 1, can be cut and bent outward to form a rectangular air outlet opening 27, where moving air, after striking each blade 13, can exit the outer drum 12. Radial placement of the air outlet opening 27 is subject to optimization of the wind turbine's performance. An exhaust cone (not depicted) can be located at the air outlet opening 27, and can occupy a shape similar to, and be made from the same or similar materials, as the air inlet collar 9, although the exact shape and dimensions may differ between the two. In certain embodiments, the exhaust cone may enhance the vertical-axis wind turbine's 100 performance by enhancing the Venturi effect. The configuration (shape, placement, dimensions, etc.) of the air inlet collar 9) can be modified, as desired, so as to initiate desired performance changes for the vertical-axis wind turbine 100 and its efficiency.

In certain embodiments, a shaft 11 can extend vertically through the outer drum 1 and the inner drum 12. The shaft 11 can be fixedly attached to the inner drum 12 and rotate with the inner drum 12. The shaft 11 can be constrained laterally and allowed to rotate by suitably positioned and mounted upper and lower bearings 20A, 20B. Illustratively, the upper bearing 20A can be attached to a mount supported by the outer drum 1, and the lower bearing 20B can be attached to a mount supported by the support structure 3. The upper and lower bearings 20A, 20B may be all or some combination of mechanical or magnetically levitated design, with their predetermined selection and placement according to the specific embodiment of the rotating elements. Illustratively, the shaft 11 may be integrated with or serve as a mount for one or more electrical generators or other devices, although these are not illustrated in FIG. 1.

Illustratively, the shaft 11, which can be unitary, such as a solid piece of metal, can extend through the vertical centerline of the inner drum 12, and can extend through the outer drum 1 along a vertical axis within the outer drum 1 that departs slightly from the vertical centerline of the outer drum 1. This off-center alignment of vertical centerlines of the inner drum 12 and outer drum 1 with respect to the shaft 11 can provide for the tips of the fully-extended blades 13 (or blade extensions 14, if incorporated) to rotate in close contact with, or touching, the inner surface of the outer drum 1 between the leading edge of the air inlet opening 25 and the leading edge of the air outlet opening 27, thereby further enabling the transfer of kinetic energy from the wind to the blades in this portion of the disclosed vertical-axis wind turbine 100. Moreover, because the blades 13 (or blade extensions 14, if incorporated) are only contacting the inner surface of the outer drum 1 when passing through this segment, then the blades 13 (or blade extensions 14, if incorporated) will not contact the inner wall of the outer drum 1 during the rest of their rotation, thereby reducing friction loss.

As also depicted in FIG. 1, structural supports 22A, 22C (structural supports 22B, 22D are hidden) extend from the scoop 5 along the outer drum 1 to the directional vane 23. In certain embodiments, the directional vane 23 can include a flat sheet of metal or other suitable surface. In other embodiments, the directional vein 23 can be curved to take advantage of the Bernoulli effect. Illustratively, an internal framework 24 can provide structural strength to the directional vane and to help support any curve or other structure to take advantage of the Bernoulli effect. In certain embodiments, the directional vane 23 can also include two overwind flaps 101A, 101B, in the form described for the first overwind flap 8. In other embodiments, the directional vane 23 can include a more than two overwind flaps 101A, 101B, such as is desirable in such embodiments.

Illustratively, the structural supports 22A, 22C (supports 22B, 22D hidden by 22A, 22C) connect the scoop 5, air inlet collar 9, the outer drum 1, the air outlet opening 27, and the directional vane 23, thereby permitting these pieces to rotate with the prevailing wind currents as can be directed by the directional vane 23. As such, the vertical-axis wind turbine 100 can accommodate shifting wind currents since the air path through the vertical-axis wind turbine 100 is adjusted by the wind currents as they move across the directional vane 23.

Figure 2:
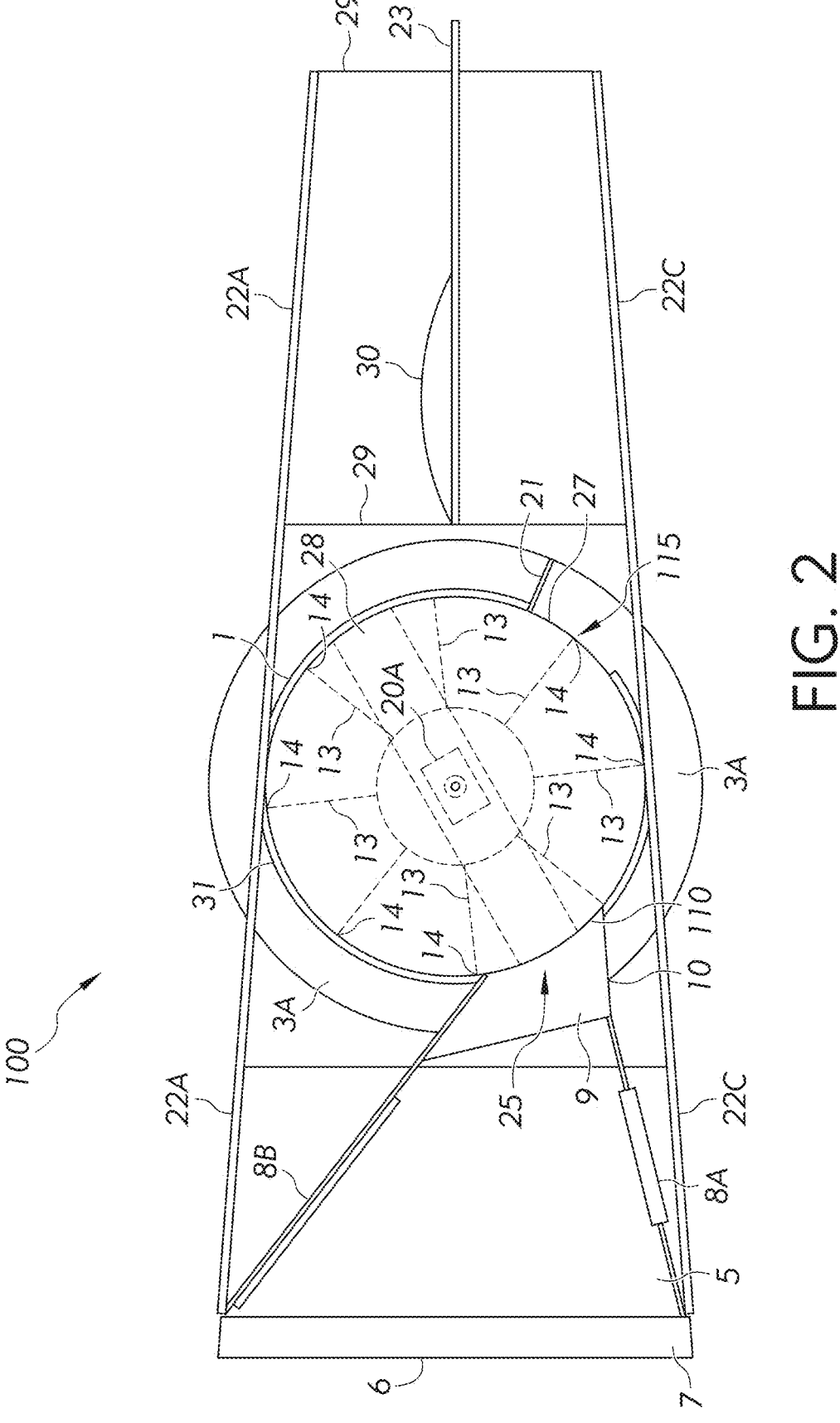
FIG. 2 depicts a top plan view of the illustrative embodiment depicted in FIG. 1.

FIG. 2A depicts the top view of the illustrative vertical-axis wind turbine 100 depicted in FIG. 1, but with the cover 17 removed. As shown, air from wind (arrows) can blow through the inlet screen 7, past inlet 6 of the scoop 5 and into the scoop 5, which has a triangular cross section (that is truncated on one end) when looking down from above. The first overwind flap 8A and the second overwind flap 8B disposed on the sides of the scoop 5 can yield to high or gusting winds and inlet airspeed effects, lessening the risk of damage to the scoop and providing some overpower protection to internal components. The scoop 5 can fit into and attach to the inlet collar 9, which can be attached to and supported by the outer drum 1 and the rectangular section 10 that can be cut on three edges and bent outward on its fourth edge from the outer drum to form the air inlet opening 25 in the outer drum 1. FIG. 2 also illustrates that airflow can enter the power annulus 31 substantially aligned radially with the rotational direction of the inner drum 12, and substantially perpendicular to each blade 13. Each blade 13 (or blade extension 14, where incorporated) can sweep a portion of the outer drum's 1 inner surface that extends from the leading edge 110 of the air inlet opening 25 to the leading edge 115 of the air outlet opening 27, where the air exits the power annulus 31 via the outer drum 1.

FIG. 2 depicts an embodiment of the flap 21 that can be cut and bent outward from the air outlet opening 27 and which may receive residual impact from the moving air as it exits the outer drum 1. Although the air outlet opening 27 may be configured with the depicted flap 21, in other embodiments, the flap 21 may be omitted or reconfigured at any suitable location, such as above or below the air outlet opening 27 or on the leading edge 115 of the air inlet.

FIG. 2 also depicts flexible blade extensions 14 attached to the outer long edge of each blade 13. These extension can provide some give-and-take for irregularities they encounter, and they can be curved in a backward, sweeping manner (in a manner where the curve places the tip of the blade extension 14 behind the location of the blade 13 tip during rotation) so as to provide some reaction force to the blades 13 as the air rushes backwards off them in escaping the outer drum 1.

FIG. 2 also depicts a support ring 3A as a toroid shape that can encircle at least a portion of the outer drum 1. A support beam 28 can cross the location of the shaft 11 so as to support the shaft 11 by way of the upper bearing 20A. The support beam can be attached at or near its ends at a predetermined position on the top rim of the outer drum 1, which can provide support to the support beam 28.

As also shown in FIG. 2, structural supports 22A, 22B can extend from the inlet 6 of the scoop 5, past the outer drum 1 in order to provide support to the directional vane 23. The lower pair of structural supports 22B, 22D are hidden below the upper supports 22A, 22C. In certain embodiments, the directional vane 23 can be mechanically attached to the structural supports 22A-22D via threaded rods 29 at or near the leading and trailing edges of the directional vane 23, although in other embodiments, such structural supports 22A-22D can be attached at any suitable locations on the directional vane 23. Nuts or similar hardware which can be positionally adjusted along the threaded rods control the horizontal angle of the directional vane 23 relative to the scoop 5. The threaded rods 29 and nuts, along with the curved side 30 of the directional vane 23, if included, provide nearly instantaneous adjustments to the inlet 6 of the scoop 5 to optimize airflow through the scoop 5 into the power annulus 31. The predetermined aerodynamic shape of the curved side 30, if included, is intended to enhance the degree to which its pull is proportional to wind speed.

Figure 3:
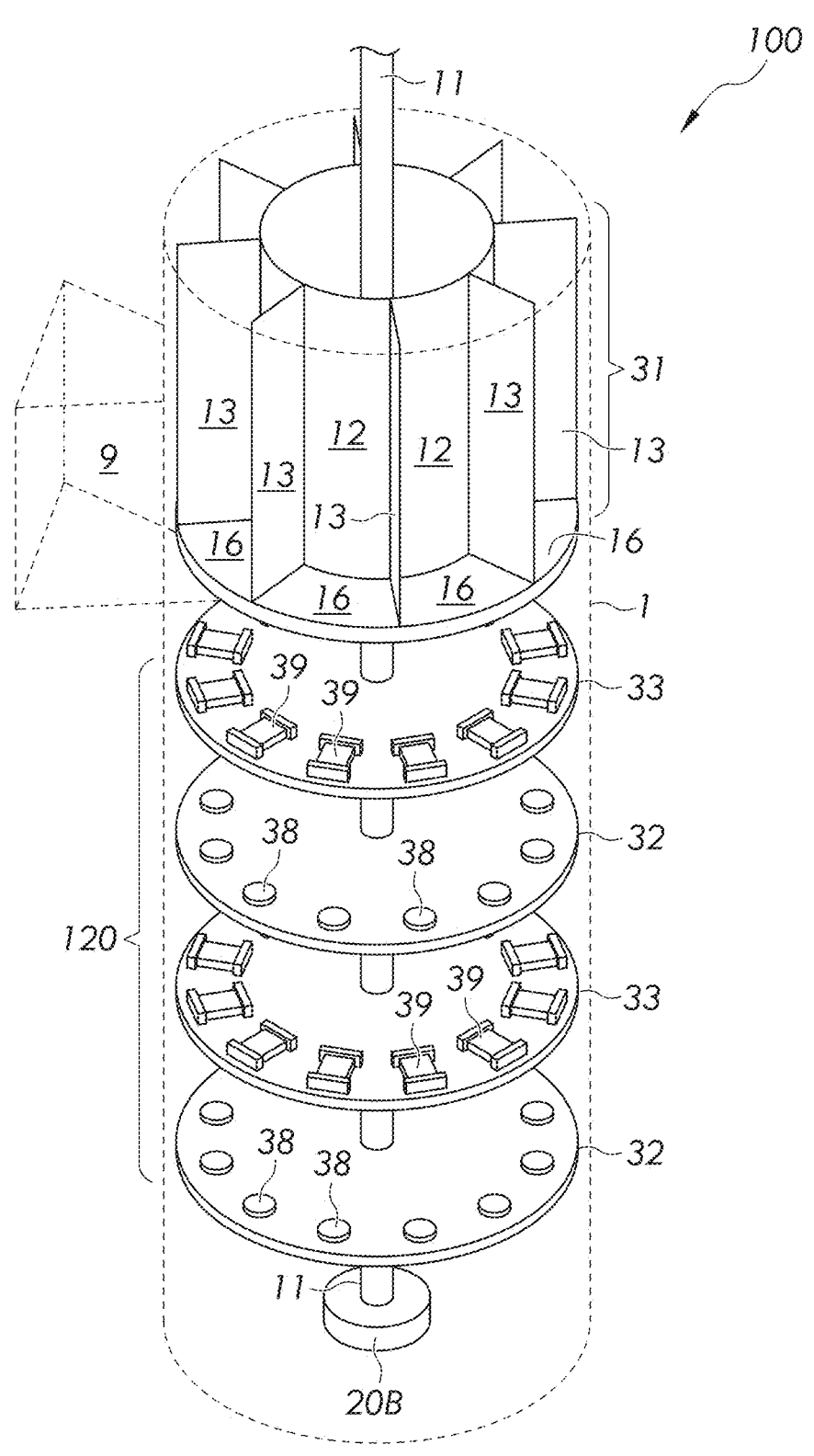
FIG. 3 depicts a front partial perspective view of the illustrative embodiment depicted in FIG. 1.

Turning now to FIG. 3, depicted is an embodiment of the invention 100 with a portion of the outer drum 1 wall removed, so as to reveal some of the inner contents of the vertical-axis wind turbine 11. As shown, the shaft 11 extends from the lower bearing 20B along the vertical centerline of the inner drum 12. A plurality of blades 13 can be disposed around the outer wall of the inner drum 12, with such blades being bounded at the bottom by the bottom toroid enclosure 16 and at the top by the top toroid enclosure 15. Also depicted is the inlet collar 9, which is used to direct air into the power annulus 31.

The bottom portion of the outer drum 1 can include an area 120 for electrical generators 32, 33, such as the depicted permanent-magnet electrical generators, that can be directly mounted to the shaft 11. Although the depicted embodiments illustrate this area 120 as part of the inner area of the outer drum 1, in other embodiments, the area 120 can reside within a portion of the inner drum 12 and/or the support structure 3, as well. Depicted are a plurality of permanent magnet disks 32 (including a plurality of permanent magnets 38) and stator disks 33 (including a plurality of stator coils 39) that can work in conjunction to produce power from the wind received by the vertical-axis wind turbine 100. Although arranged on the permanent magnet disk 32 and the stator disks 33, the permanent magnets 38 and/or coils 39 can be arranged in any suitable configuration on or in conjunction with any suitably shaped carrier to achieve a desired power generation.

Figure 4B:
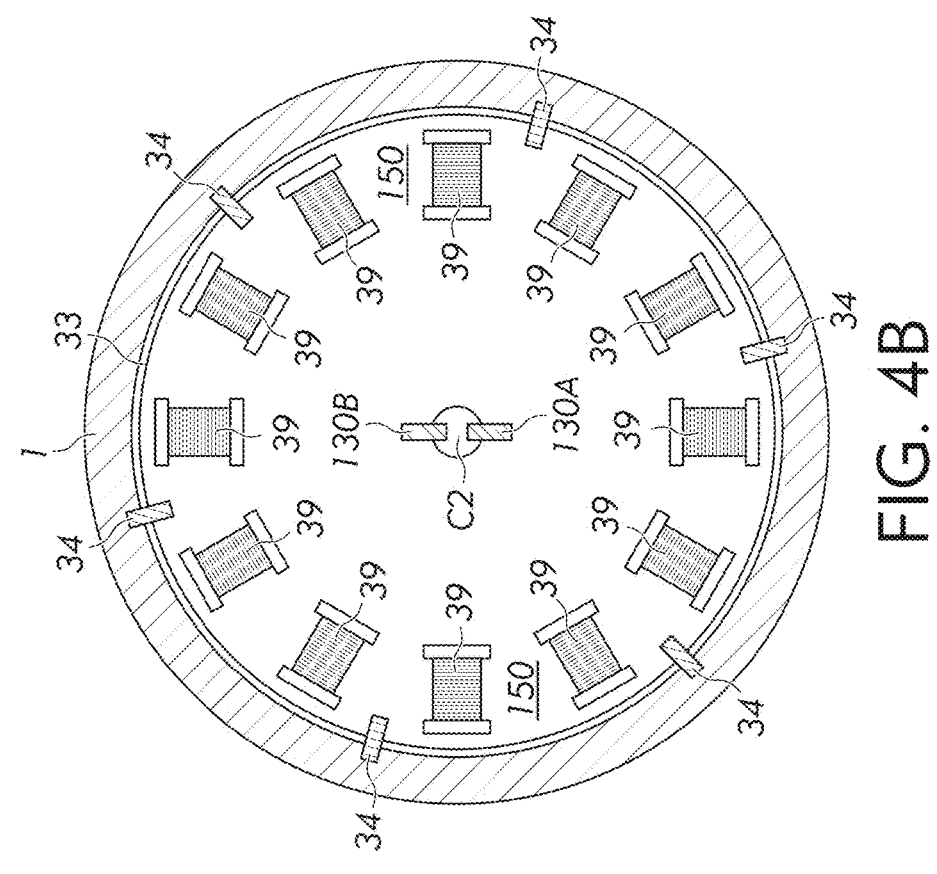
FIG. 4B depicts a top plan view of an illustrative stator disk of the invention.
Figure 4A:
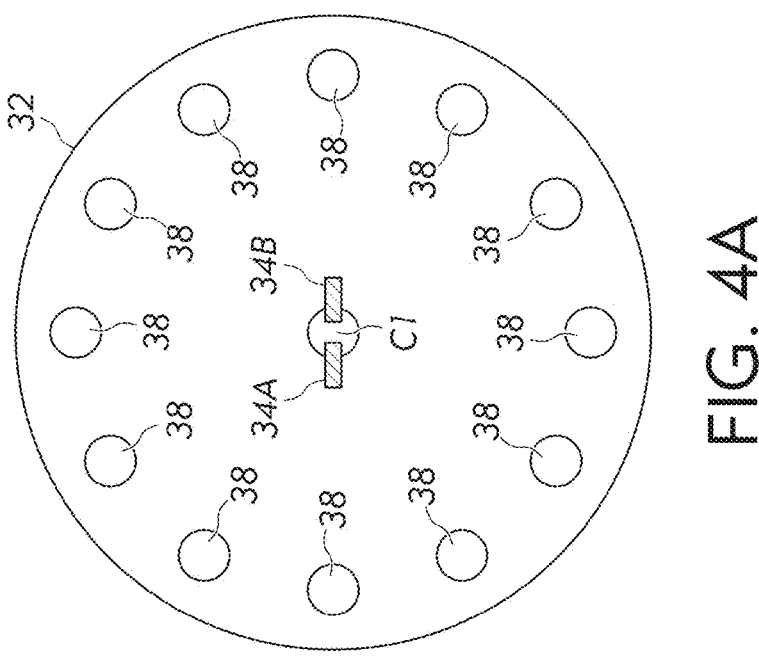
FIG. 4A depicts a top plan view of an illustrative permanent-magnet disk of the invention.

Turning now to FIG. 4A, a section of an illustrative permanent-magnet disk 32 that includes a plurality of permanent-magnets 38 is disclosed. The permanent-magnet disk 32 can include one or more slots near its center C1 to enable the disk to slide axially on keys 34A, 34B that can be fixed to the shaft 11 (not disclosed) so as to enable the permanent-magnet disk 32 to rotate synchronously with the shaft 11.

As depicted in FIG. 4B, a stator disk 33 that includes a plurality of stator coils 39 can be incorporated into the vertical-axis wind turbine 100 to provide an axial-flux (axial-air gap) generator. The stator disk 33 can include a bearing 35 that occupies the center of the stator disk 33. The bearing 35 can include slots 130A, 130B near its center C2 to enable the stator disk 32 to slide axially on keys 130A, 130B that can be fixed to the shaft 11 (not disclosed) so as to enable the inner part of the bearing 35 to rotate synchronously with the shaft 11, while the outer race 150 of the stator disk 32 is stationary and does not rotate with the shaft 11. The stator disk 32 can also be keyed to the inner surface of the outer drum 1 so as to help prevent rotation of the stator disk 32, but to permit axial movement of the stator disk 32.

Figure 4C:
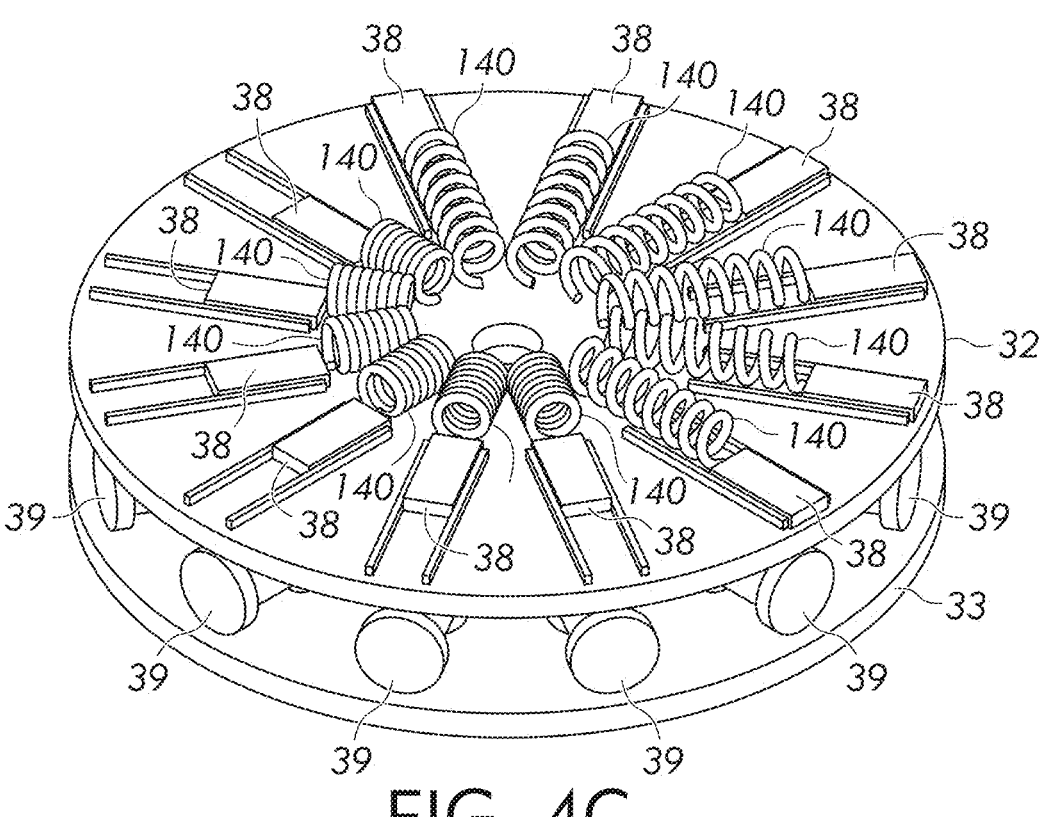
FIG. 4C depicts an upper right perspective view of segments of an illustrative permanent-magnet disk and an illustrative stator disk of the invention.
Figure 4D:
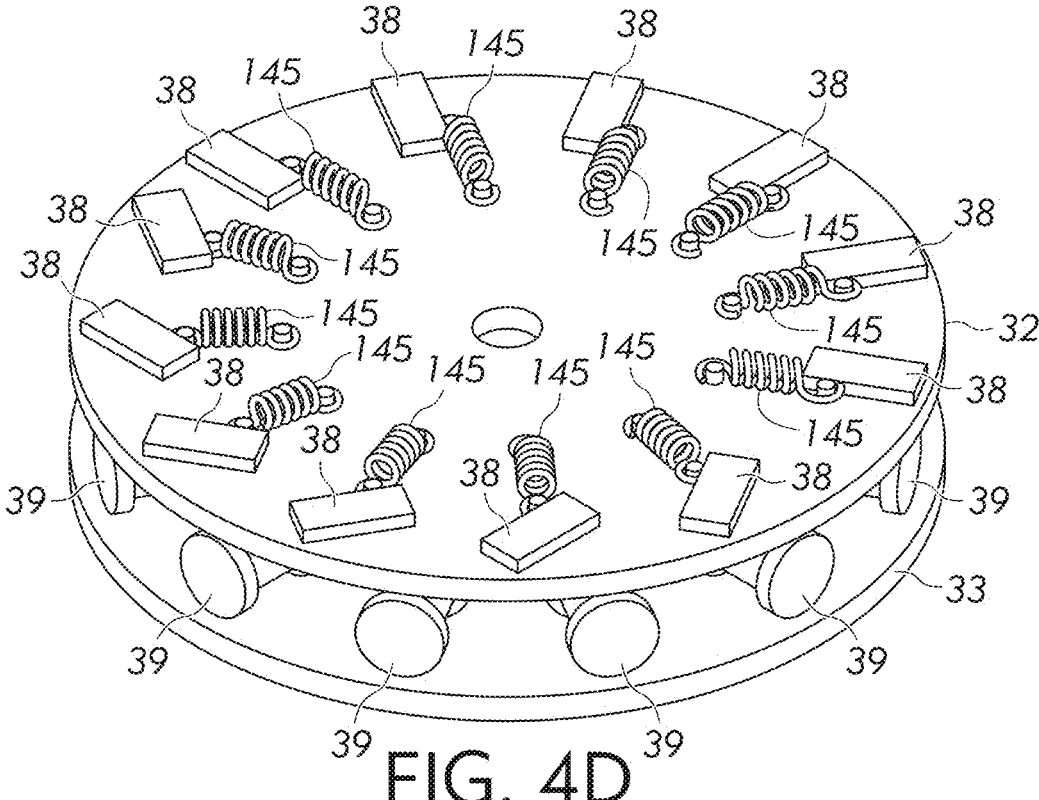
FIG. 4D depicts an upper right perspective view of segments of an illustrative permanent-magnet disk and an illustrative stator disk of the invention.

Illustratively, FIGS. 4C and 4D show embodiments in which the centrifugal force of a rotating permanent-magnet disk 32 can change the orientation or position of permanent magnets 38 to engage magnetically with a corresponding plurality of stator coils 39 that can be fixed on a relatively non-rotating surface, such as stator disk 33 or the inner surface of a suitable generator casing 36 (not depicted). This movement of the permanent magnets 38 can reduce magnetic cogging, which is where permanent magnets 38 in a rotor lock onto the solid cores of the stator coils 39 when they are proximal and at rest. Cogging increases the force necessary for a permanent-magnet disk 32 to start turning. Once the permanent-magnet disk 32 begins to rotate, the permanent magnets 38 need to pass close by the stator coils 39 to interact adequately to induce electron flow in the stator coils 39.

FIG. 4C depicts a radial-flux arrangement of slidably mounted permanent magnets 38 that can be axially attached to coiled springs 140. In this embodiment, the permanent magnets 39 can toggle or slide between an extended position and a retracted position. When the permanent magnet disk 32 reaches a rotational speed above a certain value, then the permanent magnets 28 move from their retracted position to their extended position where they can magnetically engage with the stator coils 39.

As illustratively depicted in FIG. 4D, the springs 145 can pivot permanent magnets 38 radially between an extended position and a retracted position. In these embodiments, the springs 145 can include a coil spring, flat spring, and the like. When the permanent magnet disk 32 reaches a rotational speed above a certain value, then the permanent magnets 38 move from their retracted position to their extended position where they can engage with the stator coils 39.

In illustrative embodiments, the polarity of the permanent magnets 38 must alternate appropriately depending on the design of the generator to produce an alternating current. This current is regulated by a control system to meet the requirements of the load, whether that load is energy storage or direct use. In another illustrative embodiment, a squirrel-cage stator (not shown) 39 can be used with permanent magnets 38 of optimized shape that can be aligned such that only the poles of the same polarity come into proximity with the stator coils 39 as they sweep by, thus producing a unidirectional current which will then be regulated by an appropriate control system.

Figure 5:
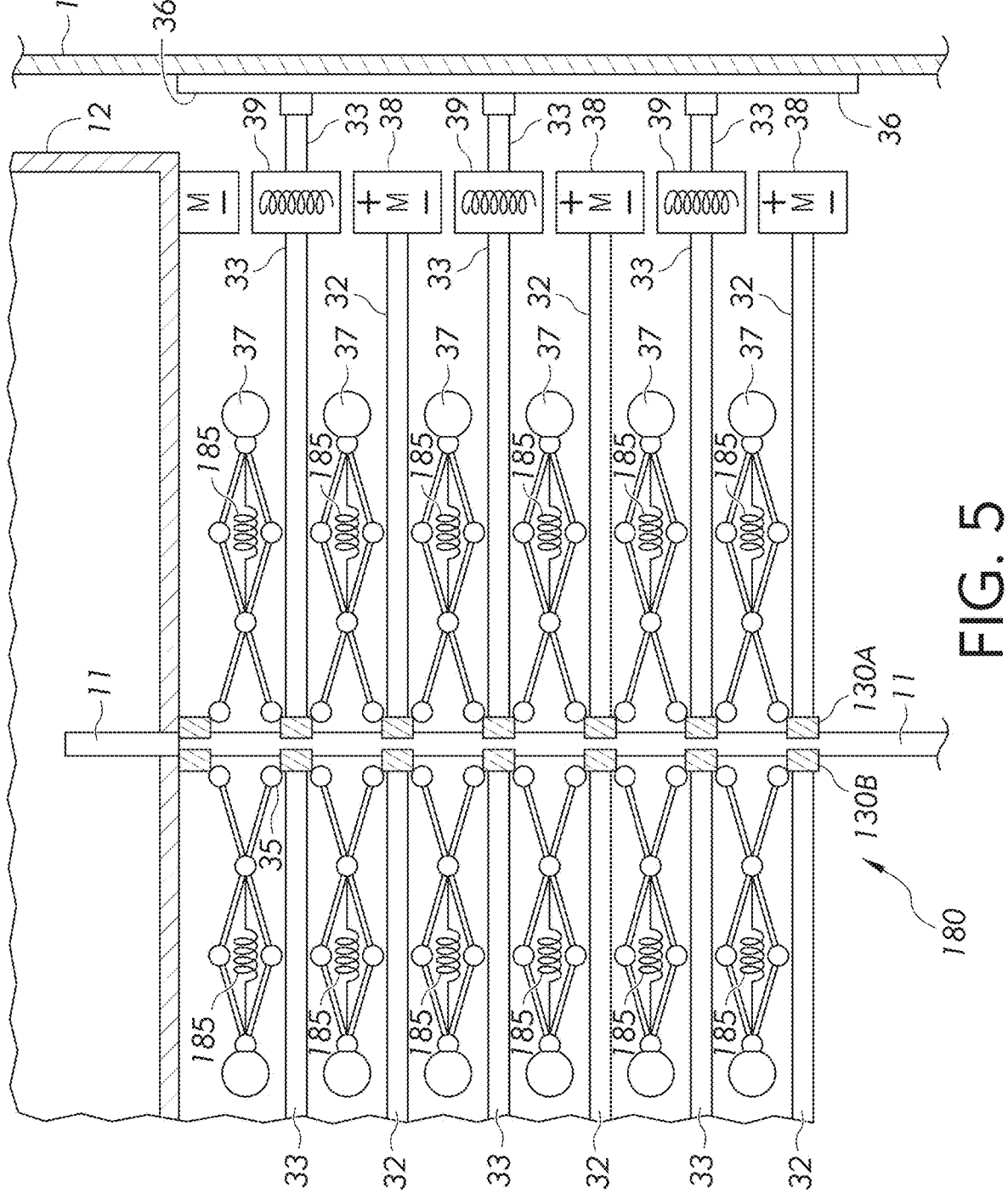
FIG. 5 depicts a side elevation view of an illustrative power generation assembly of the invention.

FIG. 5 discloses an embodiment that includes an axial-flux permanent magnet electrical generator 180 that resides in a vertical-axis wind turbine 100. The embodiment includes a plurality of permanent magnet disks 32 that can interlock with the shaft 11 using axial keys 34A, 34B in a manner that permits the permanent magnet disks 32 to slide axially along the shaft 11. This embodiment also includes a plurality of stator disks 33 that can slide axially along the shaft 11, such as by using keys 34A, 34B that can be fixed to the shaft 11 and the part of the stator disk 33 bearing 35 that rotates with the shaft 11. The outer portion of the stator disks 33 can optionally slide within tracks on or within the generator casing 36 that can reside within the inner surface of the outer drum 1. The keys 34A, 34B that interlock with the permanent magnet disks 32 and the keys 130A, 130B that interlock with the stator disks 33 can engage with the shaft 11 in a way that permits the permanent-magnet disks 32 and stator disks 33 to slide along the shaft 11 and the inner wall of the generator casing 36 during operation of the axial-flux permanent magnet electrical generator 180. The shaft 11 can be the same shaft 11 that the drives the power annulus 31 (not depicted in FIG. 5) or can be a separate shaft 11 that is used to rotate the permanent-magnet disks 32, within an axial-flux permanent magnet electrical generator 180.

Governors 37 are provided that can be positioned radially about the shaft 11, such as in one or more horizontal planes. The governors 37 can be connected at one end to a permanent-magnet disk 32 and to the inner (shaft-linked) race of bearing 35 of stator disks 33. These governors can control the distance between successive alternating permanent magnet disks 32 and stator disks 33. When at rest, springs 185 or other means can pull the governors 37 toward the shaft 11, holding a permanent-magnet disk(s) 32 (with their permanent magnets 39 (not depicted) and adjacent stator disk(s) 33 (with their stator coils 39 (not depicted) apart. This configuration can reduce magnetic cogging such that only small wind force is needed to permit rotation of the permanent-magnet disks 32. As the force of the wind increases, the rotational speed of the permanent-magnet disks 32 increases, and the inherent centrifugal force overcomes the force of the springs 185, and the governors 37 pull the disks together. Magnetic flux can then induce current in the stator coils 39 in proportion to rotational speed. Mechanical limits can restrain the permanent magnets 38 and stator coils 39 at their predetermined optimal distance, keeping them from touching. The masses represented by the weights of the governors 37 adds to the weights of the rotating permanent-magnet disks 32 and of the rotating inner drum 12 and blades 13 can provide rotational momentum which can smooth out slight variations in wind speed and its effects. Illustratively, the governors 37 can be attached in any suitable configuration that permits the governors 37 to turn with or in proportion with the shaft 11 and to move of the permanent magnet disks 32 and stator disks 33 axially toward and from one another.

By setting governor 37 counterweights and spring 185 constants at appropriate values, the embodiment disclosed in FIG. 5 can provide a power output related to the wind velocity. Increased airflow through the power annulus 31 can increase rotational speed, which is transmitted directly or indirectly to the axial-flux permanent magnet electrical generator 180. As rotational speed increases, centrifugal force can increase on the governors 37. The governor 37 at the bottom of the axial-flux permanent magnet electrical generator 180 only need raise one permanent-magnet disk 32, which is the lowest permanent-magnet disk 32 so as to engage it the lowest stator disk 33. As rotational speed increases further, centrifugal force on the next governor 37 can be sufficient to raise both of the lowest permanent-magnet disk 32 and the lowest stator disk 33. This process can continue with increased rotational speeds until all of the permanent-magnet disks 32 and the stator disks 33 are lifted vertically. Likewise, as rotational speed decreases incrementally, the permanent-magnet disks 32 and the stator disks 33 descend incrementally to their original positions.

As discussed above, the power production in axial-flux permanent magnet electrical generator 180 can be additive. Not only in the numbers of permanent-magnet disk 32 and coil disks 33 that are engaged, but since the stator cores 39 in each stator disk 33 remain vertically aligned, and the permanent magnets 38 also remain aligned as they rotate, magnetic flux is cumulative. The axial-flux permanent magnet electrical generator 180 can induce more electrical power in each stator core 39, with further increases in power generation as speed of magnetic flux lines across core windings increases. The control system can be designed to handle these parameters as it feeds power to storage and load.

Illustratively, the electrical generators illustrated and described in certain embodiments herein, including FIGS. 3 through 5, can be implemented without directly connecting them to the shaft 11 that is connected to the power annulus 31, and such electrical generators can be constructed separately, to be used either with the turbine assembly or in some other configuration, including as standalone generators.

Electrical generators and other vertical-axis turbine windmill 100 components and implementations are discussed in U.S. Pat. No. 11,149,715 to Moore, U.S. Pat. No. 7,863,765 to Yang, and/or U.S. Patent App. Pub. No. 2021/0355909 to Pienczykowski, each of which is hereby incorporated by reference in its entirety as if fully set forth herein.

Figures 6A, 6B:
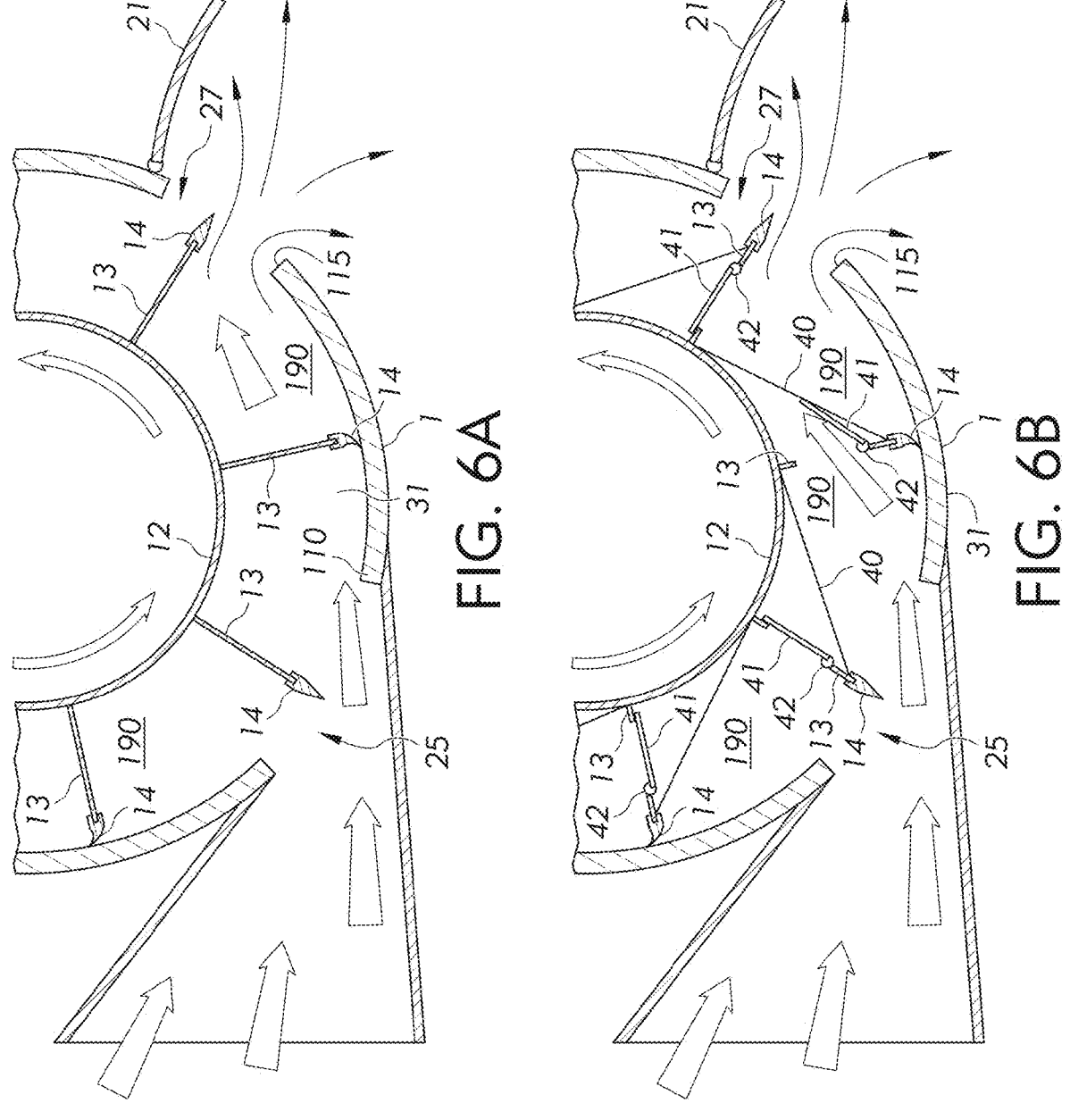
FIG. 6A depicts a partial top plan view of an illustrative cross-sectional section of the outer drum and inner drum where the blades can contact the inner wall of the outer drum.
FIG. 6B depicts a partial top plan view of an illustrative cross-sectional section of the outer drum and inner drum where the blades can contact the inner wall of the outer drum.

FIG. 6A depicts a top view of a portion of the power annulus 31. As shown, the blades 13 can be straight, flat, rigid pieces, attached at right angles vertically to the outer surface of the inner drum 12 and to the top toroid enclosure 15 (not depicted) and the bottom toroid enclosure 16 (not depicted). The illustrative inner drum 12, top toroid enclosure 15, bottom toroid enclosure 16, when combined with two blades 13 can form five sides of a chamber or cell 190 that can rotate through the power annulus 31. As a blade 13 passes by the leading edge of the air inlet opening 110 in the outer drum 1, the cell 190 is open to receive the airflow. The cell 190 rotates into the segment defined by the leading edge of the air inlet opening 110 and the leading edge of the air outlet 115. This sweep surface provides a sixth side to the rotating cell 190, keeping airflow from bypassing the blade 13. When the blade extension 14 at the outer end of the blade 13 crosses the leading edge of the air outlet 115 into the air outlet opening 27, the airflow is released, and due to the reverse curvature of the blade extension 14 may provide additional reaction force via the blade 13 to the inner drum 1 and shaft (11). The cell continues to rotate and any residual airflow exiting the power annulus can impact the flap 21, with its vector favoring optimal positioning of the inlet scoop 5.

In another embodiment, the exhaust cone (not depicted) can be fixedly attached to the outer drum 1 such that air passing out of the power annulus 31 passes through the air outlet opening 27 and then the exhaust cone, which may be configured to vector exhaust air to impact the flap 21 to enhance optimal positioning of the inlet scoop 5.

The construction of the embodiment depicted in FIG. 6A can provide a workable wind system, but the embodiment shown in FIG. 6B adds and integrates improved safety and efficiency. FIG. 6B depicts a top view of a portion of an illustrative power annulus 31. First, a diagonal cell divider 40 can divide the cell 190 by extending from the intersection of the blade 13 with the outer wall of the inner drum 12 and extending in a direction generally opposite of the rotational direction of the inner drum 12 until it attaches to the prior blade 13 at a location near its tip (near the inner wall of the outer drum 1). This placement of the diagonal cell divider 40 can eliminate turbulence on the backside of the blade 13 as it passes through the air inlet opening 15. Moreover, the diagonal cell divider 40 can direct the airflow such that it impacts the air-receiving blade at an approximately right angle to facilitate the blade's 13 receipt of kinetic energy from the airflow. In certain embodiments, the diagonal cell divider 40 can also be attached to the top toroid enclosure 15 and the bottom toroid enclosure 16. In yet additional embodiments, the end of the diagonal cell divider 40 that is close to the intersection of the outside wall of the inner drum 12 and the blade 13 can be left unattached, such that air can leak through the line of contact.

Turning now to the left-hand portion of FIG. 6B, in certain embodiments, a gust flap 41 can be included and, is shown in its closed position on the left-hand side of FIG. 6B. On the right-hand side of FIG. 6B, the gust flap 41 is shown in the open position. In certain embodiments, the vertical-axis wind turbine 100 can enable efficient operation with gust flaps 41 shut in steady winds of all but the highest velocities. While high wind velocity is always of concern with wind-related systems, the greatest risk of damage arises when the difference between airflow velocity and the velocity of mechanical components becomes excessive. This can occur with rapid increases in wind speed, or gusts, or when even steady airflow through the turbine exceeds the capacity of the turbine or of the power-generating system. Overwind flaps 8 on the inlet scoop 5 and overwind flaps 101A, 101B on the directional vane 23 provide some defense against both hazards, and gust flaps 41 provide a final defense closest to the most sensitive components. The blade 13 to the left in FIG. 6B shows a gust flap 41 with a spring-controlled hinge 42, in the shut position. The springs 42 and pivot operate near the outside edge of the blade 13. In the event a gust or strong wind causes an excessive difference between airflow and rotational velocities, as gust flap 41 illustrates, the gust flap 41 opens, releasing the overpressure into the wedge-shaped space behind it, then, the spring 42 can shut flap 41. Air can be released through the line of contact into the next cell which already faces the air outlet opening 27. Illustratively, gust flaps 41 can be included in every blade 13 or only a subset of the blades 13, as desirable.

Figure 6D:
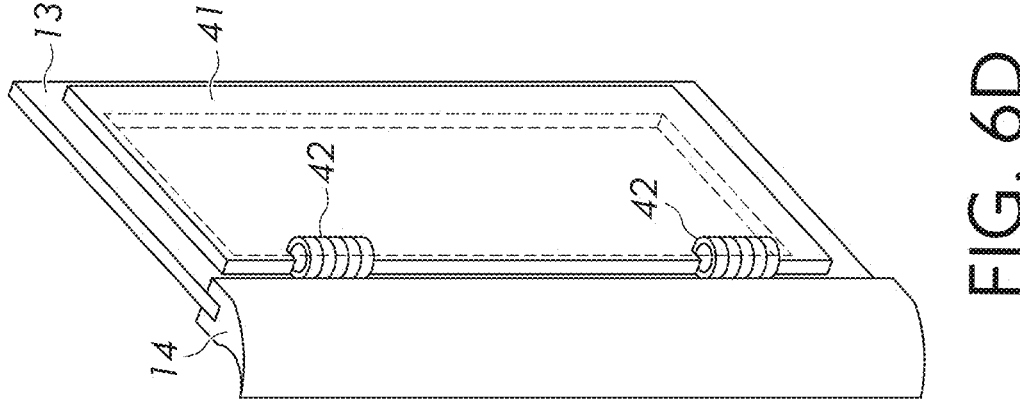
FIG. 6D depicts a front perspective view of an illustrative blade of the invention that incorporates a gust flap.
Figure 6C:
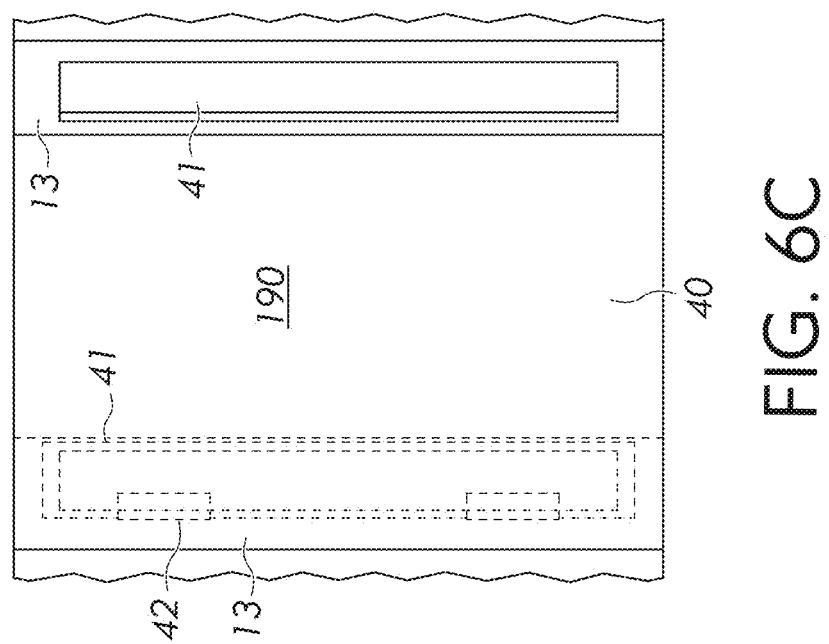
FIG. 6C depicts a side elevation view of an illustrative cross-sectional section as it appears looking radially through the upper portion of the outer drum.

FIG. 6C shows a side view of an illustrative cell 190 of the invention as it would appear by looking radially through the upper portion of the outer drum 1. The blade 13 on the left-hand side can include an open gust flap 42 displayed as hidden behind a rectangular cell divider 40 that can extend to the base of a second blade 13 on the right-hand side of FIG. 6C. The blade on the right-hand side of FIG. 6C includes a closed gust flap 41. FIG. 6D shows a perspective view of a blade 13 with a flexible blade extension 14 and a shut gust flap 41 with two springs 42 which can control help modulate the gust flap 41 between and open and closed position.

Figure 6E:
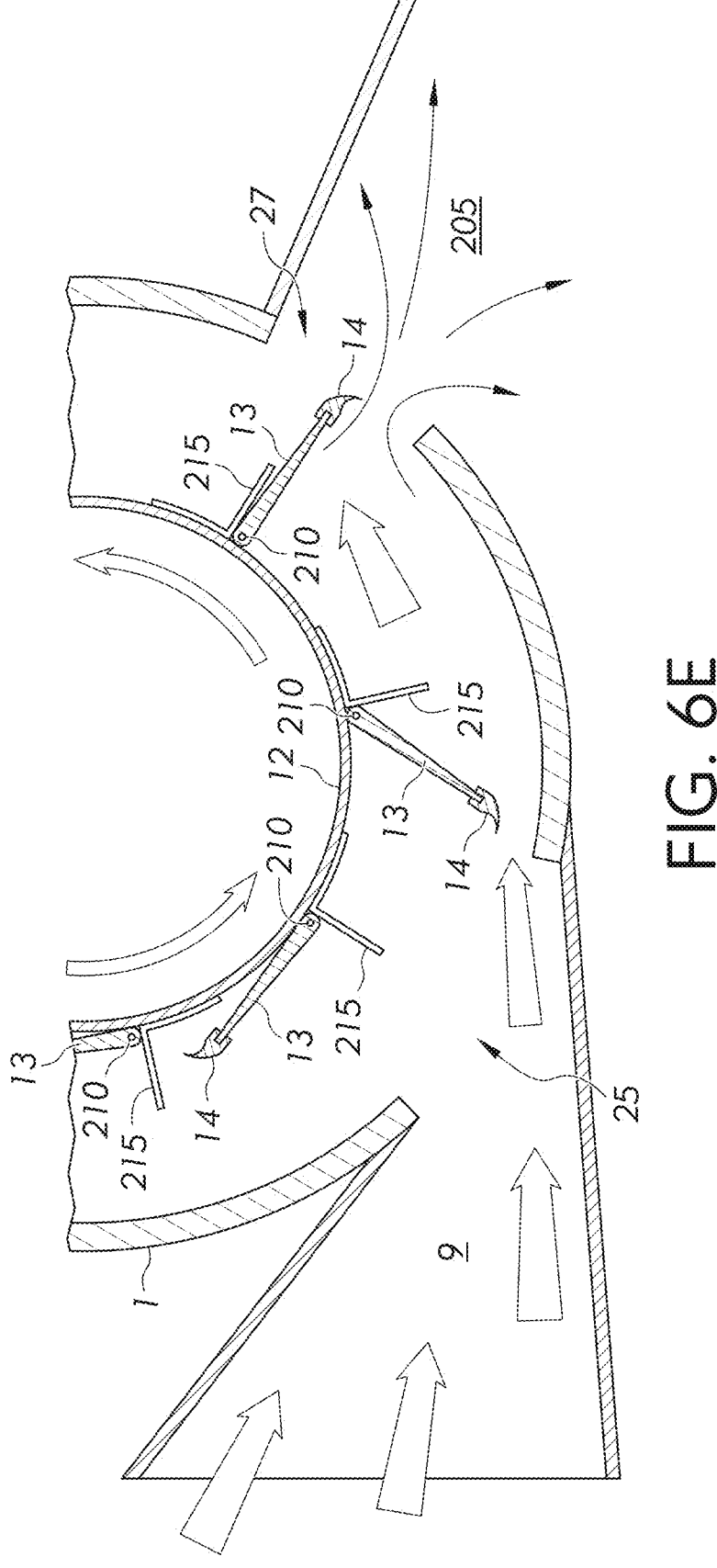
FIG. 6E depicts a partial top plan view of an illustrative cross-sectional section of the outer drum and inner drum where the blades can contact the inner wall of the outer drum.

Although the embodiments disclosed in FIGS. 6A-6D incorporate fixed blades 13, in other embodiments, swiveling blades 13 can be used, as illustrated in FIG. 6E, with pivots 210 for each blade set on the top toroid enclosure 15 and the bottom toroid enclosure 16. In these embodiments, springs (not depicted) linked by pivots 210 can pivot each of the blades 13 individually to lie flat or close against the outer surface of the inner drum 12 during periods of low wind and low rotational speed. As windspeed increases, each blade 13 can be pulled open against the force of its spring (not depicted), such as when as it passes into and through the power annulus 31, until it is restrained from further movement by stoppers 215, at approximately a right angle to the inner drum 12, being fully extended. On exiting the power annulus 31, where the air can exit through the exhaust cone 205, each blade's 13 spring (not depicted) can pivot the blade back to its position close to or against the inner drum 12; except that at high rotational velocities, centrifugal force may exceed the spring force, causing the blade 13 to remain partially or fully extended through the balance of its circuit. In another embodiment, the stoppers 215 can be excluded, and a back spring (not depicted) or set of back springs (not depicted) engages each blade 13 when it is fully extended, providing resistance to but permitting further pivotal travel. This allows some wind to pass through the Venturi, maintaining its effect, and provides overwind relief, while at the same time making additional power available through the lower pressure created on the back side of each "overextended" blade 13. As with the single-spring embodiment, air-induced forces on the blade 13 can end as soon as the blade 13 passes out of the power annulus; the back spring (or set of back springs) can disengage when the blade 13 is fully extended, and the first spring can return the blade 13 to the inner drum 12 as before. In either of these embodiments the cell dividers 40 can be omitted, if desirable. The gust flaps 41 can be omitted in certain embodiments, as well, such as if the back-springs are implemented, if their omission is desirable.

Figure 7A:
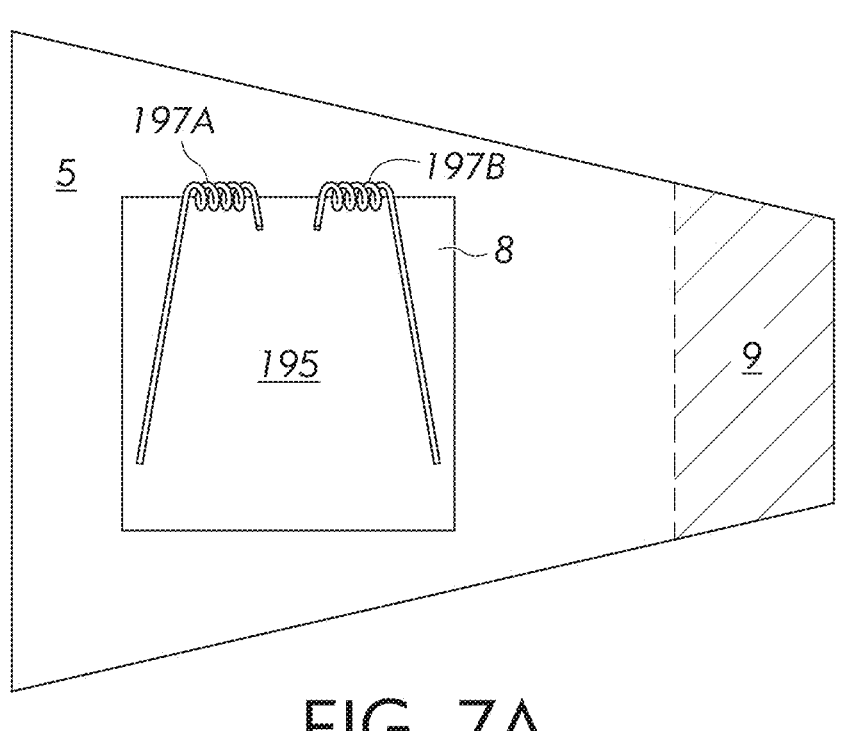
FIG. 7A depicts a side elevation view of the back side of an illustrative overwind flap of the invention.
Figure 7B:
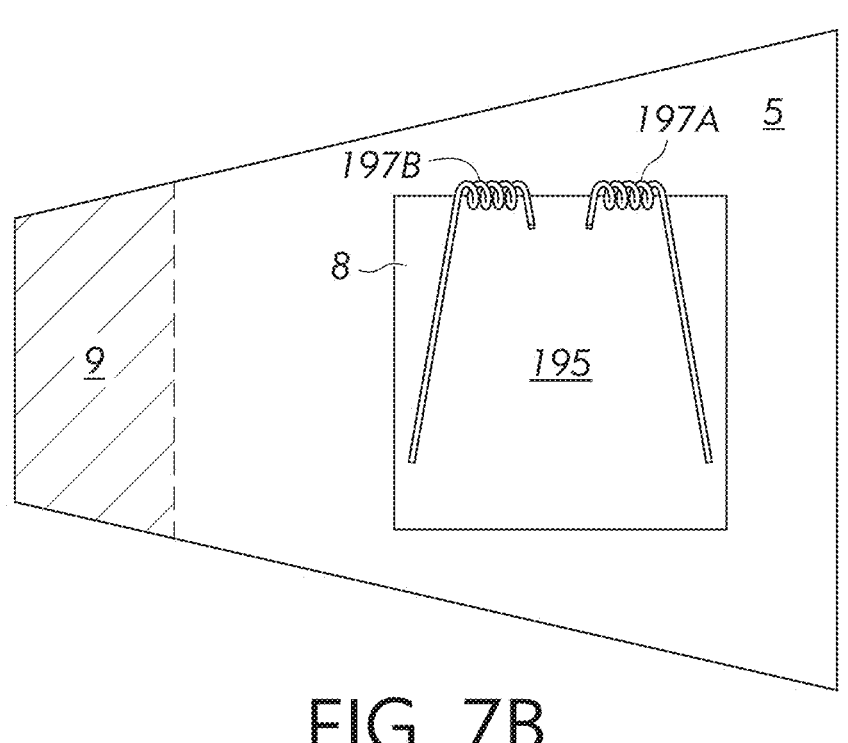
FIG. 7B depicts a side elevation view of the front side of an illustrative overwind flap of the invention.

Turning now to FIGS. 7A and 7B, are the front (FIG. 7A) and rear side (FIG. 7B) of a second overwind flap 195 that can be included in the scoop 5 or inlet funnel. The cross hatching in each of FIGS. 7A and 7B is the section of the second overwind flap 195 where the inlet collar 9 provides support to the air inlet collar 9. As depicted, the second overwind flap 195 can includes hinges 197A, 197B to permit the second overwind flap 195 to swing in either direction from the second overwind flap 195. The hinges 197A, 197B can be placed and structured to return the second overwind flap 195 to a closed position coplanar with the relevant side wall of the scoop 5. The edges of the second overwind flap 195 and its frame can include materials that minimize the sound from snapping open or shut, while mitigating turbulence and wind loss. The hinges 197A, 197B can include be any suitable device, such as springs or the like, as is desirable. Illustratively, the hinges 197A, 197B may be positioned on either the top or the leading edge of the overwind flap 195, as is desired.

Figure 8:
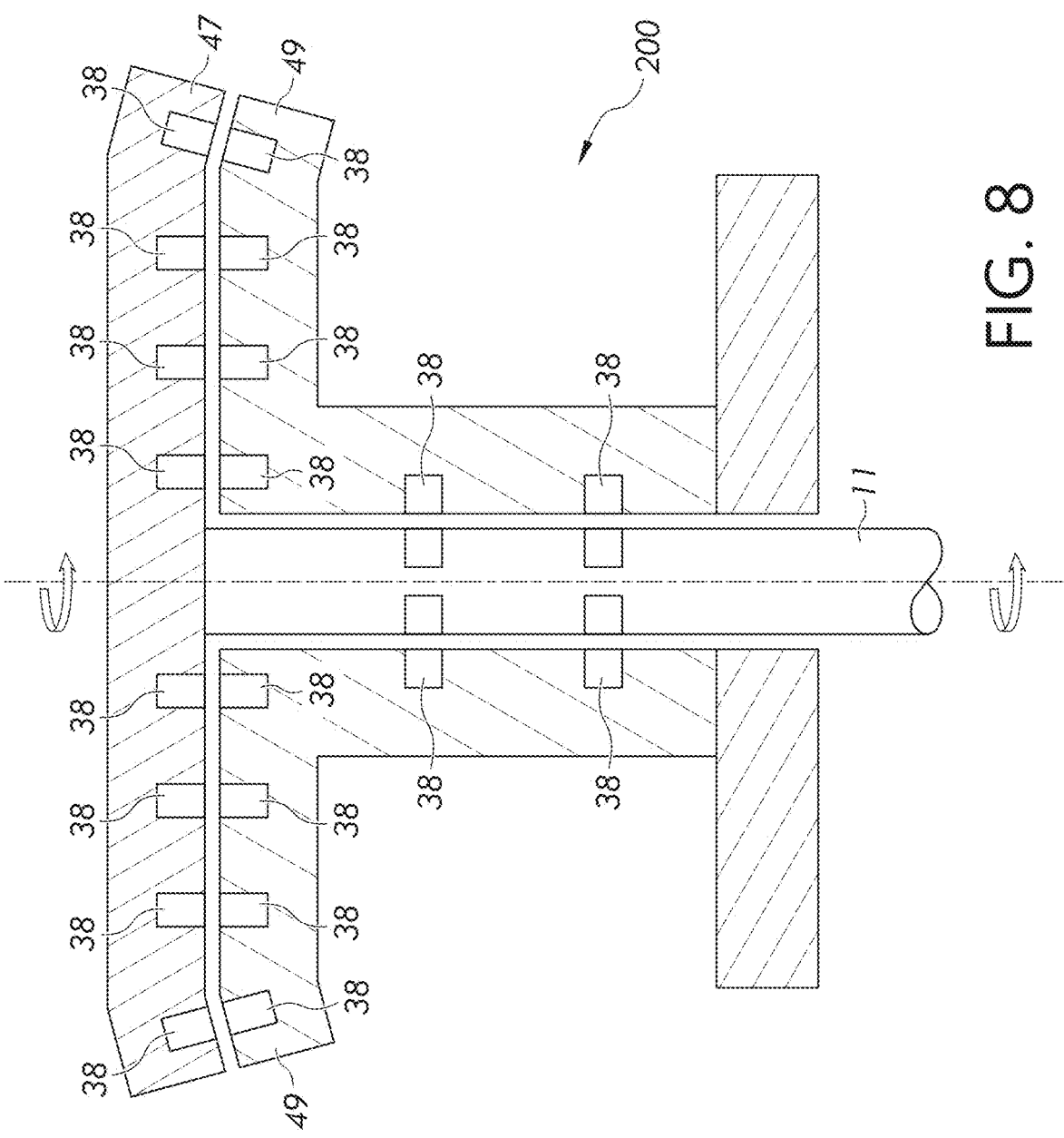
FIG. 8 depicts a side elevation view of an illustrative axial magnetically-levitated bearing.

Turning now to FIG. 8, depicted is an embodiment that includes an axial magnetically-levitated bearing 200 that can be attached to shaft 11. In the depicted embodiment, the axial magnetically-levitated bearing 200 can include a plurality of permanent magnets 38 can be set in rows or rings with like poles in each row or ring facing like poles in opposing rings or rows. The permanent magnets 38 can be arrayed with like poles on upper ferromagnetic plates 47 and lower ferromagnetic plates 49 such that each of the upper ferromagnetic plate 47 and the lower ferromagnetic plate 49 acts as a monopole, repelling the other. The upper ferromagnetic plate 47 can be attached coaxially with the shaft 11, which hangs below it and to which other components are coaxially attached, as is a lower bearing which can be fixedly attached to a non-rotating surface at a predetermined distance below the inner drum 12.

Figure 9:
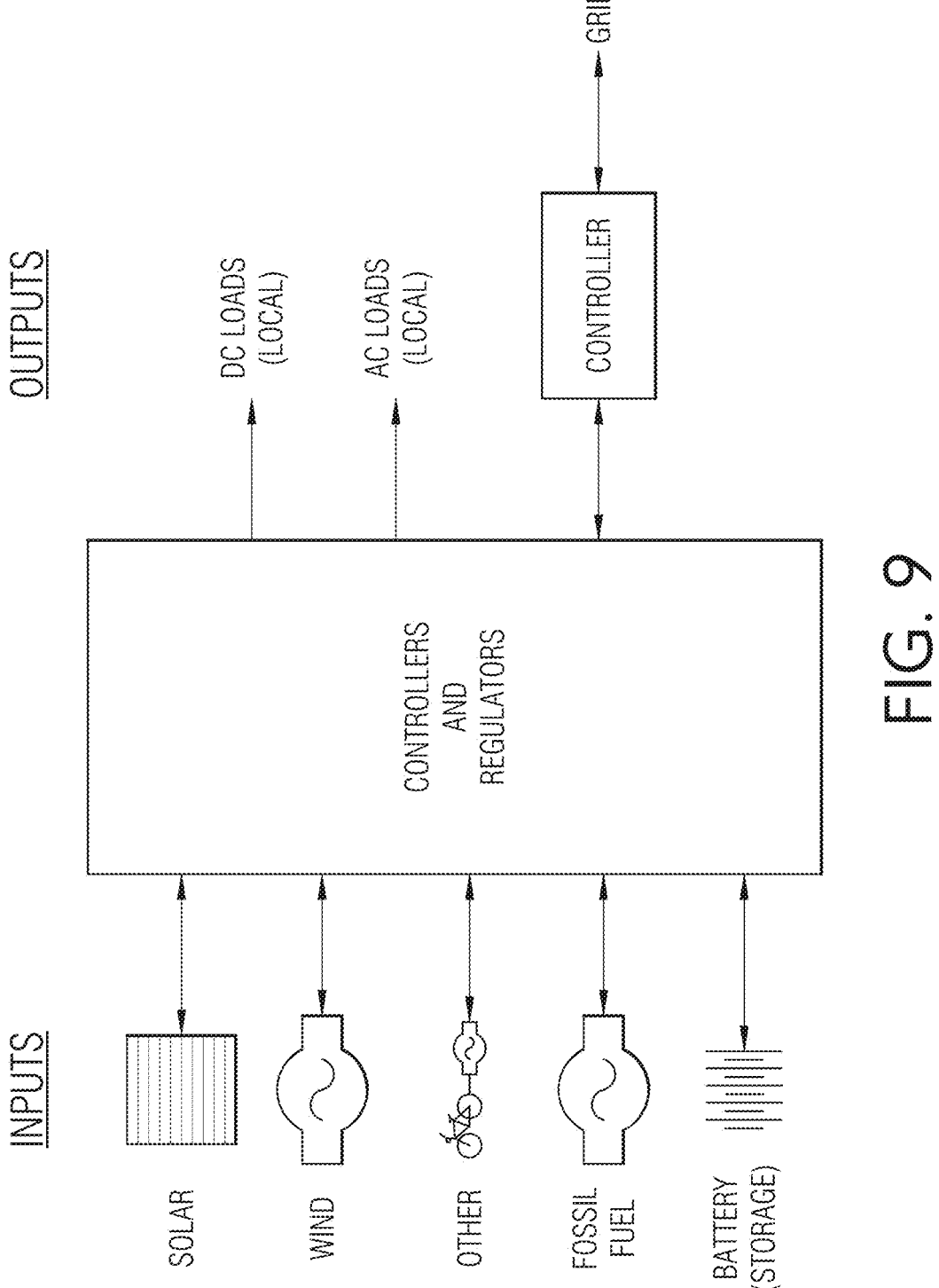
FIG. 9 depicts a schematic of an illustrative hybrid electric system for a vertical-axis wind turbine.

Illustratively, FIG. 9 provides a general schematic of a hybrid electric system for a vertical-axis wind turbine 100. Inputs to on the left include solar, wind, and fossil fuel power generation, as well as an input labeled "other" which could include some unanticipated power source such as water-powered or human-produced power, as from a bicycle-based generator. These inputs feed alternating or direct current into a set of controllers and regulators, which dispense it as alternating or direct current to local loads. In some embodiments of this system, power production may be sufficient and consistent enough to supply power into the grid, likely through other circuitry which may be required by grid constraints. This system may also be configured to draw power from the grid. Also shown on the left of FIG. 9 as a battery is an electrical storage device or system such as lithium- or vanadium-based cells. In certain embodiments, the windmill turbine system detailed above will link with a storage device such as one that is lithium- or vanadium-based to provide sufficient electrical energy for a home or farm, with a fossil-fueled generator on standby, or to supplement wind and battery during times of heavy demand or low wind-powered production.

This power provided to the controllers and regulators shown in FIG. 9 can be arranged within the support structure of a vertical-axis wind turbine 100. For simplicity, as in the simplest embodiment, when wind-generated power exceeds demand, excess power can be channeled to charge the battery. When demand increases above wind-generated power, the battery fills in the difference. The fossil-fueled generator can kick in when demand exceeds that available from both wind and battery, or when the charge in the battery falls below a predetermined level. Any of these parameters can be pre-adjusted and may be further adjusted on-site, and the availability of other power sources, as detailed herein, allows for a great deal of flexibility for multiple applications.

Figure 10:
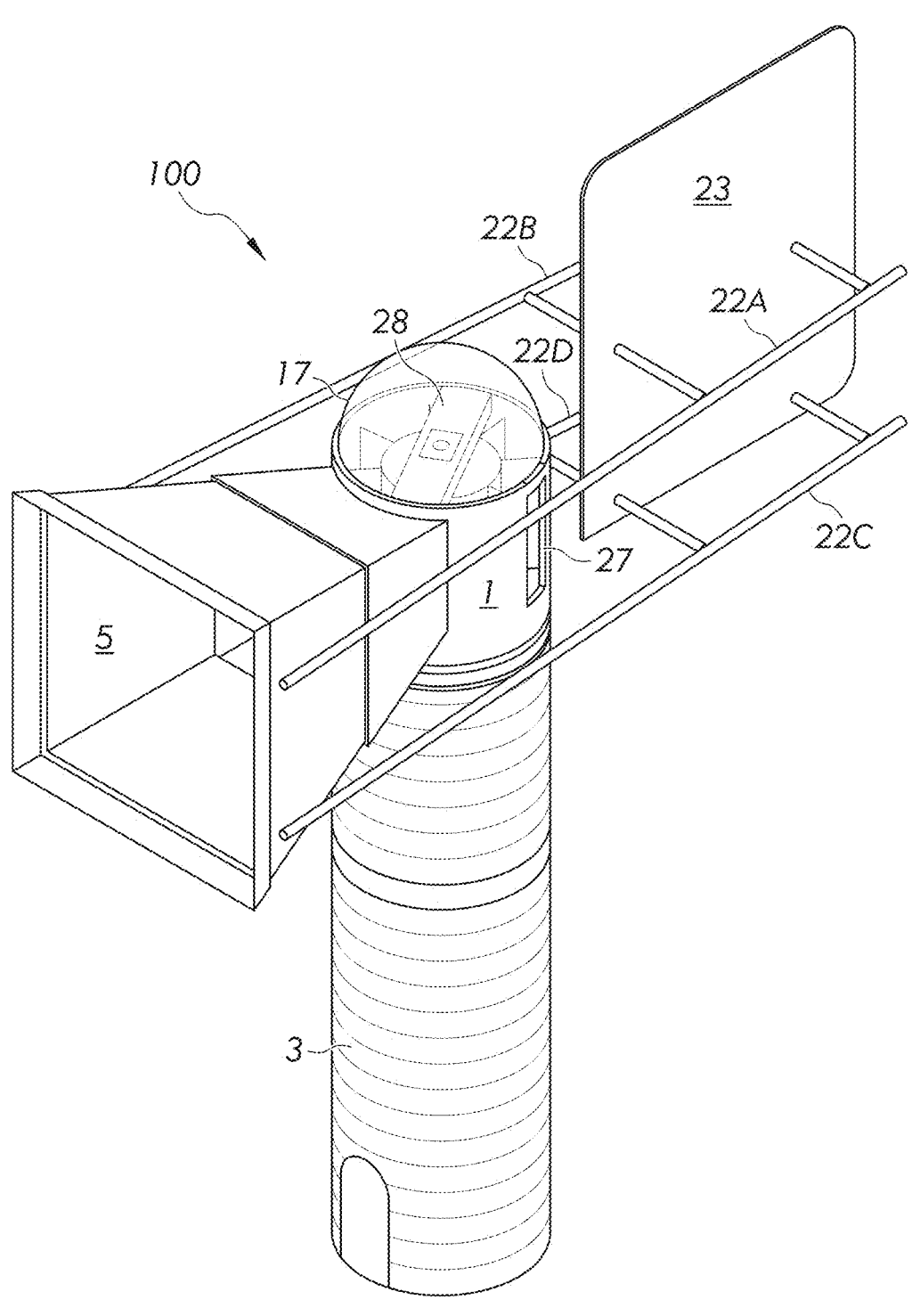
FIG. 10 depicts a front-left perspective view of an illustrative vertical-axis wind turbine of the invention.

FIG. 10 depicts an illustrative vertical-axis wind turbine 100 that includes an outer drum 1, scoop 5, and directional vane 23. The vertical-axis turbine windmill 100 can include structural supports 22A, 22B, 22C, 22D that can be attached to the scoop 5 and the outer drum 1 to support the directional vane 3. The disclosed vertical-axis turbine windmill can also include an air outlet opening 27 in the outer drum 1, as well as a cover 17. The outer drum 1 can include any of the embodiments described herein that can provide a power annulus 31. The illustrative vertical-axis wind turbine can also include a support structure 3 in the form of a silo, which can contain an illustrative power generator, such as those described herein.

The vertical-axis wind turbine 100 systems can be incorporate any suitable support structure 3, such as concrete culvert piping stacked on end (incorporating access holes for maintenance and repair), or integrated with a traditional American farm silo, with clearance on all sides, and far enough above accessible surfaces, to allow the scoop 5 and directional vane 23 to swing freely without striking anything, animate or inanimate.

In smaller embodiments, such as those utilizing a 55-gallon drum as the outer drum 1, rotational velocity for a given wind speed correlates with higher rpm than in larger embodiments like those built to fit farm-silo-fitting support structures 3.

Therefore, smaller embodiments can more easily support direct drive generators and other devices requiring high rpm. The larger embodiments can more easily support geared or pulley-driven devices to enable higher rpm as needed for the particular application. In any case, the shaft 11 and/or the top toroid enclosure 15 and/or bottom toroid enclosure 16 can transmit power to electrical generators or other devices.

All publications cited herein are hereby incorporated by reference in their entirety as if each had been individually incorporated by reference and fully set forth.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. A vertical-axis wind turbine, comprising:

an outer drum having an outer surface, an inner surface, and a top end, wherein said outer drum further includes an air inlet opening and an air outlet opening;

a scoop that is configured to direct air into said air inlet opening of said outer drum;

an exhaust funnel that is configured to direct air from said outer drum;

a directional vane that is attached to said top end of said outer drum, wherein said directional vane is configured to rotate said outer drum in a manner that directs air from prevailing wind currents into said scoop;

an inner drum having an outer surface that includes a plurality of elongate blades for receiving wind currents from said scoop, wherein said inner drum is configured to rotate separately from said outer drum when said plurality of elongate blades receive wind currents from said scoop;

wherein each of said elongate blades further includes a tip;

wherein said inner drum is located within said outer drum in a manner such that each of said tips contacts only a segment of said inner surface of said outer drum that extends between a leading edge of said air inlet opening and a leading edge of said air outlet opening; and wherein each of said elongate blades is affixed to said outer surface of said inner drum such that each of said elongate blades can move from a first position, where each of said elongate blades lies against said outer surface of said inner drum and a second position, where each of said elongate blades are perpendicular to said outer surface of said inner drum.

2. The vertical-axis wind turbine of claim 1, wherein each of said elongate blades moves from said first position to said second position using springs configured to pull each of said elongate blades to said outer surface of said inner surface at lower rotational speeds of said inner drum.

3. The vertical-axis wind turbine of claim 1, further comprising a stack of alternating permanent magnet disks and stator disks, wherein said stack is configured to rotate on a vertical shaft within said outer drum at a location beneath said inner drum.

4. The vertical-axis wind turbine of claim 3, wherein each permanent magnet disk and each stator disk is configured to move axially in relation to one another along said shaft.

5. The vertical-axis wind turbine of claim 4, wherein at least two governors are located between each permanent magnet disk and each stator disk pair in said stack.

6. The vertical-axis wind turbine of claim 5, wherein each of said governors is attached to each permanent magnet disk and each stator disk pair in a manner that permits each of said governors to rotate with said shaft.

7. The vertical-axis wind turbine of claim 6, wherein each of said governors is attached to an inner bearing of each stator disk so as to enable each of said governors to rotate with said shaft.

8. The vertical-axis wind turbine of claim 7, wherein each of said governors operate to pull each said permanent magnet disk and each said stator disk in said stack toward one another as the rotational speed of said shaft increases and to permit each said permanent magnet disk and each said stator disk to move away from one another other at lower rotational speeds so as to prevent cogging.

9. The vertical-axis wind turbine of claim 8, wherein each said permanent magnet disk includes a plurality of permanent magnets.

10. The vertical-axis wind turbine of claim 9, wherein each said stator disk includes a plurality of stator coils.

* * * * *